(12) United States Patent
Ha

(10) Patent No.: US 10,551,967 B2
(45) Date of Patent: Feb. 4, 2020

(54) TWO-WAY COMMUNICATION BETWEEN AN ELECTRONIC CARD AND A TOUCHSCREEN DEVICE

(71) Applicant: Elwin Yui Hang Ha, Hong Kong (CN)

(72) Inventor: Elwin Yui Hang Ha, Hong Kong (CN)

( * ) Notice: Subject to any disclaimer, the term of this patent is extended or adjusted under 35 U.S.C. 154(b) by 0 days.

(21) Appl. No.: 16/398,232

(22) Filed: Apr. 29, 2019

(65) Prior Publication Data

US 2019/0278457 A1    Sep. 12, 2019

Related U.S. Application Data

(63) Continuation-in-part of application No. PCT/CN2018/112522, filed on Oct. 30, 2018.

(60) Provisional application No. 62/579,163, filed on Oct. 31, 2017.

(51) Int. Cl.
*G06F 3/041* (2006.01)
*G06F 3/03* (2006.01)
*G06F 3/044* (2006.01)
*G06K 19/067* (2006.01)

(52) U.S. Cl.
CPC ............. *G06F 3/04166* (2019.05); *G06F 3/03* (2013.01); *G06F 3/044* (2013.01); *G06K 19/0672* (2013.01)

(58) Field of Classification Search
CPC ........ G06F 3/03; G06F 3/044; G06F 3/04166; G06K 19/0672

USPC .......................................................... 398/115
See application file for complete search history.

(56) References Cited

U.S. PATENT DOCUMENTS

| | | | | |
|---|---|---|---|---|
| 7,876,288 | B1 * | 1/2011 | Huang | G06F 1/1616 345/178 |
| 8,497,850 | B2 * | 7/2013 | Foerster | G06F 3/0488 345/174 |
| 2011/0284640 | A1 * | 11/2011 | Mullen | G06Q 20/352 235/469 |

* cited by examiner

*Primary Examiner* — Dalzid E Singh
(74) *Attorney, Agent, or Firm* — Eagle IP Limited; Jacqueline C. Lui

(57) ABSTRACT

Systems and methods of bi-directional communication between an electronic card and a touchscreen device is described. The method may include modulating an electrostatic field of the touchscreen device using touch communication channels; receiving visible light signals from the touchscreen device in response to the modified electrostatic field via one or more optical communication channels; ranking, by the electronic card, the optical communication channels according to the signal quality received from each optical communication channel; selecting at least one optical communication channel as preferred optical communication channel based on the ranking; and using the preferred optical communication channel and the touch communication channels for subsequent bi-directional communication.

20 Claims, 16 Drawing Sheets

TWO-WAY COMMUNICATION BETWEEN AN ELECTRONIC CARD AND A TOUCHSCREEN DEVICE

CROSS-REFERENCE TO RELATED APPLICATION

This application is a Continuation-in-Part of PCT Application PCT/CN2018/112522 filed on Oct. 30, 2018, which claims priority to, and the benefit of, U.S. Provisional Application Ser. No. 62/579,163 filed on Oct. 31, 2017, entitled CARD WITH PATTERNS THAT ARE READABLE BY LIGHT. The entire contents of the foregoing applications are hereby incorporated by reference for all purposes.

BACKGROUND

The following relates generally to an electronic card, and more specifically to bi-directional communication between an electronic card and a touchscreen device. Electronic cards are used in many applications, including for facilitating financial transactions, verifying identity, and playing games. There have been developments in storing and transmitting information via capacitive coupling between electronic cards and electronic devices with touchscreens. Information transmits from the card to the electronic device when the card is placed in contact with the touchscreen.

As described in U.S. Pat. No. 9,715,687 and U.S. patent application Ser. No. 15/630,955, touchscreen devices may read information from the card, which represents a one-way communication from the card to the screen. However, using only one-way communication may limit the types of transactions for which an electronic card may be used.

SUMMARY

Systems and methods for bi-directional communication between an electronic card and a touchscreen device are described. An electronic card may be positioned near a touchscreen device, so that the device may identify the position of conductive touchpoints on the electronic card and determine the position of a photodetector of the electronic card based on the position of the conductive touchpoints. The touchscreen device may then transmit a visible light signal to the electronic card and receive a response signal via the one or more conductive touchpoints. In some cases, the touchscreen device may identify which touchpoints are communicating properly and transmit that information to the card, which can respond by selecting which touchpoints to use for communication. In some cases, the two-way communication may enable authentication procedures.

A method for bi-directional communication between an electronic card and a touchscreen device is described. The method may include identifying a position of one or more conductive touchpoints of the electronic card, determining a position of a photodetector of the electronic card based at least in part on the position of the one or more conductive touchpoints, transmitting a visible light signal to the electronic card based at least in part on the position of the photodetector, and receiving a response signal via the one or more conductive touchpoints based on transmitting the visible light signal.

An apparatus for bi-directional communication between an electronic card and a touchscreen device is described. The apparatus may include a processor, memory in electronic communication with the processor, and instructions stored in the memory. The instructions may be operable to cause the processor to identify a position of one or more conductive touchpoints of the electronic card, determine a position of a photodetector of the electronic card based at least in part on the position of the one or more conductive touchpoints, transmit a visible light signal to the electronic card based at least in part on the position of the photodetector, and receive a response signal via the one or more conductive touchpoints based on transmitting the visible light signal.

A non-transitory computer readable medium storing code for bi-directional communication between an electronic card and a touchscreen device is described. In some examples, the code comprises instructions executable by a processor to: identify a position of one or more conductive touchpoints of the electronic card, determine a position of a photodetector of the electronic card based at least in part on the position of the one or more conductive touchpoints, transmit a visible light signal to the electronic card based at least in part on the position of the photodetector, and receive a response signal via the one or more conductive touchpoints based on transmitting the visible light signal.

Some examples of the method, apparatus, and non-transitory computer-readable medium described above may further include identifying one or more preferred communication channels based at least in part on the response signal. Some examples of the method, apparatus, and non-transitory computer-readable medium described above may further include transmitting a subsequent visible light signal to the photodetector, wherein the subsequent visible light signal comprises an indication of the one or more preferred communication channels. Some examples of the method, apparatus, and non-transitory computer-readable medium described above may further include determining a position of at least one additional photodetector based at least in part on the position of the one or more conductive touchpoints, wherein the visible light signal comprises a first part directed toward the photodetector and a second part directed toward the at least one second photodetector.

Some examples of the method, apparatus, and non-transitory computer-readable medium described above may further include identifying the position of the one or more conductive touchpoints comprises: identifying the position of three or more conductive touchpoints. Some examples of the method, apparatus, and non-transitory computer-readable medium described above may further include identifying an expected touchpoint pattern. Some examples of the method, apparatus, and non-transitory computer-readable medium described above may further include comparing the identified position of the three or more conductive touchpoints to the expected touchpoint pattern, wherein determining the position of the photodetector is based at least in part on the comparison.

Some examples of the method, apparatus, and non-transitory computer-readable medium described above may further include determining an orientation of the photodetector based at least in part on the position of the one or more conductive touchpoints. Some examples of the method, apparatus, and non-transitory computer-readable medium described above may further include performing an authentication procedure based at least in part on the response signal.

In some examples of the method, apparatus, and non-transitory computer-readable medium described above, the authentication procedure is based at least in part on a public-private key encryption protocol. In some examples of the method, apparatus, and non-transitory computer-readable medium described above, the visible light signal comprises a series of light flashes corresponding to bits of information.

In some examples of the method, apparatus, and non-transitory computer-readable medium described above, the visible light signal comprises a pilot part, a preamble, a data payload, a postamble, or any combination thereof. In some examples of the method, apparatus, and non-transitory computer-readable medium described above, the visible light signal comprises a blue light channel, a red light channel, a green light channel, or any combination thereof.

A method for bi-directional communication between an electronic card and a touchscreen device is described. The method may include modifying an electrostatic field of the touchscreen device using the one or more conductive touchpoints and receiving a visible light signal from the touchscreen device via the photodetector in response to modifying the electrostatic field.

An apparatus for bi-directional communication between an electronic card and a touchscreen device is described. The apparatus may include a processor, memory in electronic communication with the processor, and instructions stored in the memory. The instructions may be operable to cause the processor to modify an electrostatic field of the touchscreen device using the one or more conductive touchpoints and receive a visible light signal from the touchscreen device via the photodetector in response to modifying the electrostatic field.

A non-transitory computer readable medium storing code for bi-directional communication between an electronic card and a touchscreen device is described. In some examples, the code comprises instructions executable by a processor to: modify an electrostatic field of the touchscreen device using the one or more conductive touchpoints and receive a visible light signal from the touchscreen device via the photodetector in response to modifying the electrostatic field.

Some examples of the method, apparatus, and non-transitory computer-readable medium described above may further include transmitting a response signal via the one or more conductive touchpoints based on receiving the visible light signal. Some examples of the method, apparatus, and non-transitory computer-readable medium described above may further include performing an authentication procedure based at least in part on the response signal. In some examples of the method, apparatus, and non-transitory computer-readable medium described above, the authentication procedure is based at least in part on a public-private key encryption protocol.

Some examples of the method, apparatus, and non-transitory computer-readable medium described above may further include receiving a subsequent visible light signal via the photodetector, wherein the subsequent visible light signal comprises an indication of one or more preferred communication channels. Some examples of the method, apparatus, and non-transitory computer-readable medium described above may further include transmitting a subsequent signal via the one or more conductive touchpoints using the one or more preferred communication channels based on the subsequent visible light signal.

Some examples of the method, apparatus, and non-transitory computer-readable medium described above may further include receiving an activation signal from the touchscreen device. Some examples of the method, apparatus, and non-transitory computer-readable medium described above may further include activating the photodetector in response to receiving the activation signal.

A method of bi-directional communication between an electronic card and a touchscreen device is disclosed. The method may include modulating, by the electronic card, an electrostatic field of the touchscreen device using one or more touch communication channels; receiving, by the electronic card, one or more visible light signals from the touchscreen device in response to the modified electrostatic field via one or more optical communication channels; ranking, by the electronic card, the one or more optical communication channels according to the signal quality received from each optical communication channel; selecting, by the electronic card, at least one optical communication channel as preferred optical communication channel based on the ranking; transmitting, by the electronic card, a response signal via the one or more touch communication channels to indicate the at least one preferred optical communication channel to the touchscreen device; and using the at least one preferred optical communication channel and the one or more touch communication channels for subsequent bi-directional communication. Each touch communication channel comprises a conductive touchpoint at the electronic card capable of sending signal to the touchscreen device and each optical communication channel comprises at least one photodetector in the electronic card capable of receiving a visible light signal from the touchscreen device.

An electronic card capable of bi-directional communication with a touchscreen device is described. The electronic card comprises: one or more conductive touchpoints configured to communicate with the touchscreen device by modulating an electrostatic field of the touchscreen; one or more photodetectors configured to receive a visible light signal from the touchscreen device; and a microcontroller connected to the conductive touchpoints, the photodetectors and to a memory storing instructions. The microcontroller is configured to execute the instructions to cause the processor to: rank the one or more optical communication channels according to the signal quality received from each optical communication channel; select at least one optical communication channel as preferred optical communication channel based on the ranking; transmit a response signal via the one or more touch communication channels to indicate the at least one preferred optical communication channel to the touchscreen device; and use the at least one preferred optical communication channel and the one or more touch communication channels for subsequent bi-directional communication.

DETAILED DESCRIPTION

Figure 1:
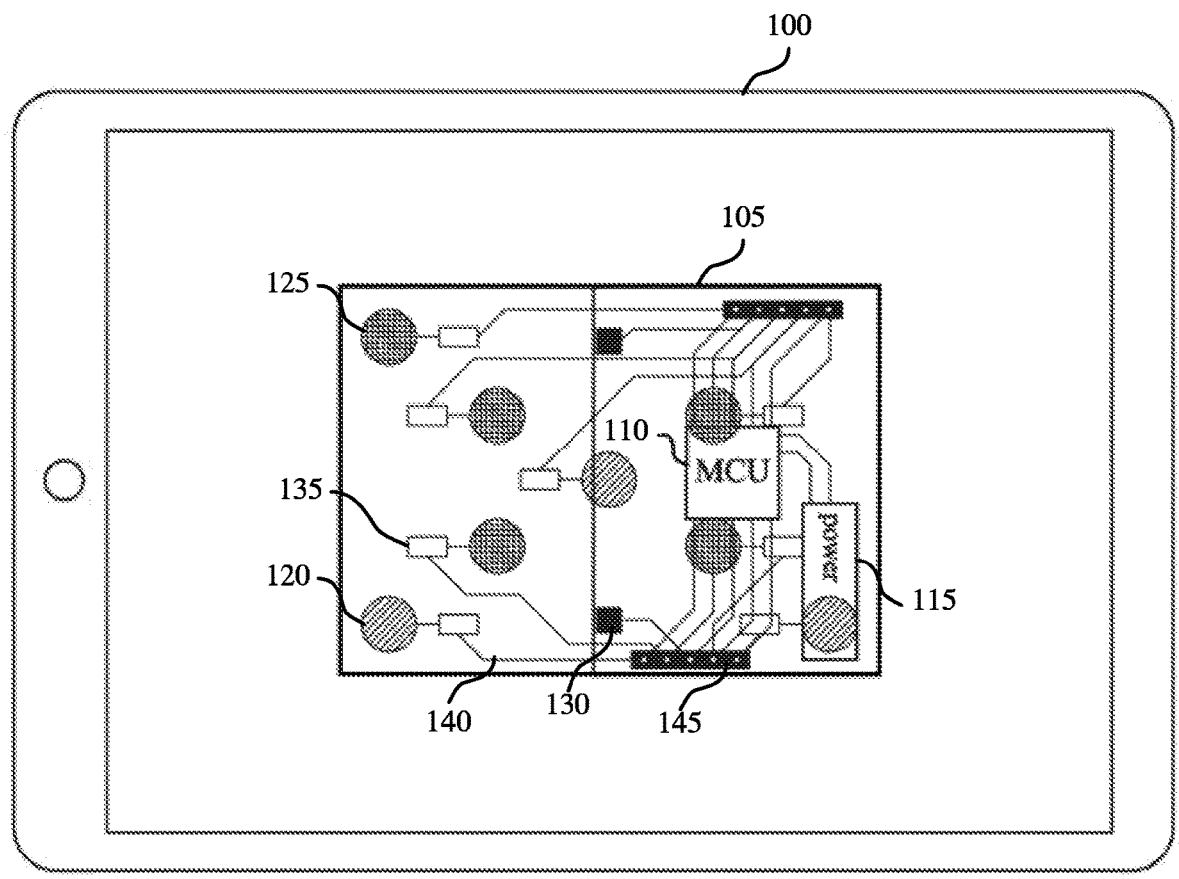
FIG. 1 shows an example of an electronic card communicating bi-directionally with a touchscreen device in accordance with aspects of the present disclosure.

The present disclosure relates to devices and methods to communicate information between a card with conductive patterns and a touchscreen device. Example embodiments in this application describe communications between the touchscreen and the card by flashing pulses of light from the touchscreen and by including one or more photodiodes in the card to receive those flashing pulses and digital information, thus enabling a two-way communication between the screen and the card.

Touchscreen devices are used in electronic devices such as game consoles, personal computers, tablet computers, electronic voting machines, and smartphones. These touchscreen devices can read information embedded in patterns formed on a nonconductive substrate of an electronic card. This substrate includes one or more switches that can be activated and deactivated to change the patterns formed on the substrate and in turn change or alter information stored on the substrate.

In the present disclosure, the terms "card" and "electronic card" and "KCP" are used to refer to the non-conductive substrate in combination with the electronic components described herein, and does not imply a particular size or shape. The electronic card may take various shapes and can be embodied or included with various types of electronic and non-electronic devices. By way of example, the card can be shaped as a flat or planar card, such as a business card, credit card, gaming card, or other handheld card. As another example, the card can be included with or embedded in product, such as embedded in a smartphone, embedded in a toy, attached to a cover or case, woven into a fabric of an article of manufacture, etc.

As yet another example, the substrate can have various sizes and shapes, such as being curved or bent or foldable. A size and shape of the substrate can also vary depending on, for example, the number and type of switches, the amount of information being stored and/or transmitted, a location where the substrate will be used, whether the substrate includes a processor or controller, etc.

In an example embodiment, the card is embedded with electrical conductors that form touch points to simulate fingertips of a user touching a capacitive touchscreen. The touch points function as information carriers that can be read by the touchscreen and electronic devices with a touchscreen. By way of example, the card of example embodiments can be used in many fields, such as gaming, ticketing, member identifications, counterfeit protections, and other technological fields.

An example embodiment includes a non-conductive substrate with a plurality of electrical conductors and switches disposed on or in the non-conductive substrate. The electrical conductors are connected together to form patterns of conductive lines and conductive geometric shapes. These geometric shapes functions as touch points that activate locations on a capacitive touchscreen. The geometric shapes or touch points can be located at ends of the conductive lines or along the conductive lines.

Some capacitive touchscreens include an insulator (such as glass) that is coated with a transparent conductor placed under the insulator. When an electrical conductor touches or comes close to the surface of the screen from above, an electrostatic field of the screen distorts and generates a measurable change in capacitance. A location of this change in capacitance is sent to a controller for processing.

The conductor touching the touchscreen can be a human finger or other conductor, such as the geometric shapes or touch points located on the non-conductive substrate of an example embodiment. When the substrate touches or comes near the touchscreen, a capacitor is formed at each of the locations of the geometric shapes or touch points that are located on or in the substrate. These touch points emulate or simulate a person touching or otherwise activating the location on the touchscreen. The controller or processor in the electronic device determines the location of these shapes or points from a change in capacitances or change in voltage as measured from locations on the touchscreen, such as the corners or sides of the touchscreen. For example, each geometric shape or touch point generates a capacitor at a location formed by a row trace and a column trace of the touchscreen. A number of capacitive X-Y grid locations or intersections on the touchscreen can vary, depending on the type and size of the touchscreen.

In an example embodiment, one or more switches are positioned on or in electrical communication with the conductive lines and the touch points. The switches are switchable between an open position or state and a closed position or state. The switches can change or alter a configuration of a geometric patterned formed by the conductive lines and touch points and read by the touchscreen. The switches can also turn touch points on (e.g., when a switch connected to a touch point is in a closed position) and turn touch points off (e.g., when a switch connected to a touch point is in an open position).

The conductive lines and the touch points form a pattern that corresponds to a unique identification of the substrate. The pattern is changeable when one or more switches switch between the open state and the closed state. A user or electronic device is thus able to change an identity or information on a substrate by turning on and off one or more switches. Each unique pattern or switching configuration on the substrate can be associated with a unique identity or particular information. The switches can also be activated and deactivated (e.g., with a processor or controller located on the substrate) to transmit information to the touchscreen, such as transmitting bits, bytes, or blocks of data.

A number of unique patterns or configurations depends on a number of conductive lines and touch points. Consider an example in which a planar card has three touch points A, B and C with a conductive line disposed between A and B, and a conductive line disposed between B and C. Two switches P and Q are disposed on the two conductive lines, respectively. Switch P is placed between A and B, and switch Q is placed between B and C. By turning switch P and Q on and off, a total of four patterns can be formed by this configuration. One of ordinary skill in the art will appreciate that the number of patterns can vary depending on various factors, such as the number of switches, the configuration of the switches, the number of conductive lines, the number of touch points, and other factors.

FIG. 1 shows an example of an electronic card 105 communicating bi-directionally with a touchscreen device 100 in accordance with aspects of the present disclosure. Touchscreen device 100 may be an example of, or include aspects of, the corresponding elements described with reference to FIG. 7. Electronic card 105 may be an example of, or include aspects of, the corresponding elements described with reference to FIGS. 2, 3A, 3B, 4A, 4B and 4C.

Electronic card 105 may include microcontroller unit (MCU) 110, power unit 115, anchor points 120, info points 125, one or more photodetectors 130, switches 135, electrical traces 140, and headers 145. Anchor points 120 and info points 125 may be examples of conductive touchpoints, and in some cases the same touchpoints may serve as both anchor points 120 and info points 125. In some examples, the anchor points 120 and info points 125 may provide for communication from the electronic card 105 to the touchscreen device 100, and the one or more photodetectors 130 may provide for communication from the touchscreen device 100 to the electronic card 105.

As shown in FIG. 1, three of the conductive points form a triangle to function as anchor points 120 for the electronic card 105. When the card is placed on a touchscreen device 100, the touchscreen device 100 detects locations of the three anchor points 120 and determines a location and an orientation of the electronic card 105 based on the locations of the three anchor points 120. One of ordinary skilled in the art will appreciate that more than three conductive points can function as anchor points 120 for the electronic card 105 by forming other shapes such as squares, pentagons, and other polygonal shapes.

The conductive points (i.e., anchor points 120 and info points 125) are connected with each other through electrical traces 140. A plurality of electrical switches 135 are positioned on the electrical traces 140 between the conductive points. The switches 135 may be switchable between an open state and a closed state. The conductive points may form a pattern that represents an identification of the card and may activate locations on a touchscreen device 100 or another suitable card reader when the electronic card 105 is placed on the touchscreen device 100. The MCU 110 communicates with the electrical switches 135 and the photodetectors 130. The MCU 110 can be powered by power unit 115, which in various embodiments may include a built-in battery or an inductance apparatus.

Conductive touchpoints (including anchor points 120 and info points 125) may enable communication by modifying an electrostatic field of the touchscreen device 100. The conductive touchpoints may also transmit a response signal based on receiving visible light signals, and transmit subsequent signals using one or more preferred communication channels indicated by the touchscreen device 100.

Anchor points 120 and info points 125 can have various shapes, including but not limited to, one or more of a square, a circle, a triangle, a star and other polygon shapes. In an example embodiment, the touch point has a circular shape with a diameter of more than 0.4 centimeters, which allows a sufficient area to couple with the touchscreen device. In another example embodiment, the touch point has a diameter smaller than 0.4 centimeters, such as being a smaller circle or formed at an intersection of two conductive lines. For instance, the touch point has a diameter of 0.3 centimeters or greater, 0.2 centimeters or greater, or 0.1 centimeters or greater. As yet another example, a touch point occurs where two conductive lines cross. Further one of ordinary skilled in the art will appreciate that these example dimensions apply to circles and other shapes, such as triangles, squares, pentagons, ovals, ellipses, and other polygonal shapes and non-polygonal shapes.

In one example embodiment, the switches 135 include, but are not limited to, one or more of bipolar junction transistors (BJT), field effect transistors (FET), micro-electromechanical system (MEMS), optoelectronic switches, digital or mechanical relays, and any other switch mechanism that enables and disables electric current or voltage flow.

By way of example, open and closed states of each switch 135 represent different patterns. Each pattern may corresponds to a unique identification. Consider an example in which the electronic card 105 is a handheld portable card. The electronic card 105 is programmable to include particular information (such as information stored and retrieved in response to reading an identity of the card), certain rights or privileges (such as access rights or access privileges to an electronic device), user authentication, etc. By changing the pattern through the switches 135, more than one identification or unique set of information can be stored in or associated with the same card. A single card can thus have a higher data storing capacity. In some cases, the electronic card 105 may also store data in a separate memory device.

In an example embodiment, additional data is stored in the substrate by switching the switches 135 between on and off states in a specific time sequence. For example, turning on switch P followed by turning on switch Q corresponds to a different identification compared with turning on switch Q followed by turning on switch P.

In an example embodiment, the electrically conducting components (including the conductive touchpoints and traces 140) may formed by a transfer foil process where an adhesive layer is partly applied to an electrically non-conductive substrate. After that, metal foil layers are applied via a transfer process to form patterns of conductive lines connected to conductive geometric shapes located at ends of the conductive lines on the substrate. Switches, for example, MEMS or optoelectronic switches are positioned between two of the geometric shapes by wire bonding or flip-chip bonding. At last, an electromagnetic interference shielding material is applied to reduce interference from external sources. The shielding material has sufficient mechanical robustness to withstand torsion and tension while maintaining its shielding properties.

In another example embodiment, the electrical conductors are formed by printing conductive ink on the electrically non-conductive substrate. The substrate is made of electrical non-conductive material that is preferably flexible and light weight, such as plastic, paper, card board, wood, glass, ceramics, fabrics, leather or a combination thereof. By way of example, the conductive ink is mixed with metal powers or metal flakes.

In another example embodiment, the electrical conductors are formed by applying a conductive sheet on the electrically non-conductive substrate followed by etching or laser process to remove unwanted areas. As one example, the unwanted areas are heated by the laser and evaporate, leaving the remaining areas to form a desired pattern.

To accomplish the desired two-way communication, electronic card 105 may include one or more photodetectors 130. The photodetectors 130 may receive a visible light signal from the touchscreen device 100 in response to changes of the electrostatic field it detects. Photodetectors 130 may also receive a subsequent visible light signal via the photodetectors 130, wherein the subsequent visible light signal comprises an indication of one or more preferred communication channels. In some examples, photodetectors 130 may have an inactive mode and an active mode. Electronic card 105 may receive an activation signal from the touchscreen device 100, and photodetectors 130 may enter an active mode in response to receiving the activation signal. In some examples, photodetectors 130 may be capable of receiving some signals (e.g., the activation signals) while in the inactive mode. In other examples, the activation signal is received via another communication channel. Photodetector 130 may be an example of, or include aspects of, the corresponding elements described with reference to FIGS. 2 and 5.

The advantages of two-way communication are multifold. First, the communication channel between the electronic card 105 with the touchscreen device 100 can be noisy and lossy, and channel characteristics can also be different depending on the build quality and minute differences of the touchscreen device 100. The communication channel can be defined specifically in this case as data transmission using the modulation of touchpoints of the electronic card 105 and the capacitive sensors on the touchscreen in one direction, and the modulation of the light from the display on the touchscreen device 100 and photodetectors 130 on the electronic card 105 in the other direction. And a touch communication channel is defined as data transmission from the touchpoints of the electronic card 105 to the capacitive sensors of the touchscreen device. An optical communication channel is defined as data transmission from the touchscreen device 100 to the photodetectors 130 of the electronic card 105.

Communications without automatic confirmation of transmission success is inherently unreliable. When miscommunication happens, the user controlling the electronic card 105 may be expected to adjust settings manually, such as moving the electronic card 105 around different areas of the screen, and this may negatively impact the user experience. This can be resolved using two-way communication between the electronic card 105 and the touchscreen device 100, with encoded visible light signals emanating from the touchscreen device 100 being the second or feedback communication channel to indicate whether the transmission from electronic card 105 to screen is successful.

In addition, a two-way communication structure and algorithm may enable adaptive channel selection and adjustment, leading to better compatibility and efficiency between the electronic card 105 and the touchscreen device 100. For example, when there are ten touch communication channels on an electronic card 105 and some of them malfunction for some reason, the visible light feedback communication channel enables the touchscreen device 100 to tell the electronic card 105 to shift information transmission load onto the specific touch communication channels that are functioning normally. As another example, the touchscreen device 100 can notify the electronic card 105 of which part of the transmitted bitstream was lossy and ask the electronic card 105 to transmit again, without manual intervention of a human user.

In addition, two-way communication enables sophisticated encryption algorithms to be implemented, e.g. public-private key encryption, or more specifically Triple Data Encryption Standard (DES), Rivest-Shamir-Adleman (RSA) or Secure Hash Algorithms (SHA), in which the touchscreen device 100 "asks" the electronic card 105 a question to which only the "correct" card knows the answer, and then reply automatically through its touch channels.

There is also an additional security benefit of the two-way communication method over other short-distance communication mechanisms, such as the Near-field communication (NFC). One major risk and concern about the NFC technology is the ability for misappropriating information from an NFC-enabled ID card or payment card, by use of an NFC card reader held for example near the wallet or pocket of the cardholder, where the NFC card is stored. In some embodiments, the two-way communication technology described herein may be configured to require physical contact between the electronic card 105 and the touchscreen device 100 for communication to occur, eliminating this security loophole. This may result in a safer means to transact sensitive data. In some examples, the methods and apparatus described herein may serve as a safety enhancement measure for NFC-based systems by requiring physical contact of the electronic card 105 with a touch-screen device for financial transactions over a certain threshold amount or for reading of important or sensitive information from an NFC card.

Figure 2:
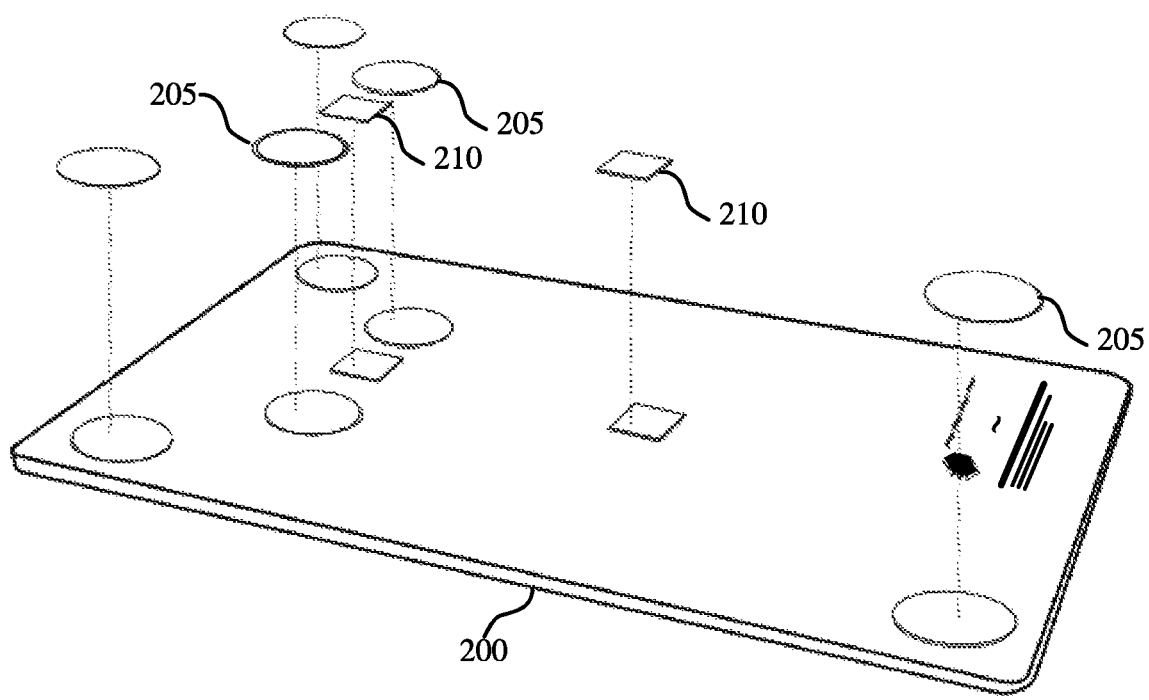
FIG. 2 shows an example of an electronic card with photodetectors in accordance with aspects of the present disclosure.

FIG. 2 shows an example of an electronic card 200 with photodetectors 210 in accordance with aspects of the present disclosure. Electronic card 200 may also include conductive touchpoints 205 (i.e., anchor points and info points as described with reference to FIG. 1). Electronic card 200 may be used for a variety of purposes as described herein, but one skilled in the art would recognize that these purposes are examples and do not limit the applications for which an electronic card 200 capable of two-way communication may be used. Electronic card 200 may be an example of, or include aspects of, the corresponding elements described with reference to FIGS. 1, 3A, 3B, 4A, 4B, and 4C.

In one example, electronic card 200 may be used for financial transactions (e.g., as a payment card). For example, the electronic card 200 may provide payment processors such as Europay, MasterCard and Visa (EMV) advantages over magnetic stripe credit cards. The use of a personal identification number (PIN) and cryptographic algorithms such as Triple DES, RSA and SHA provide authentication of the card to the processing terminal and the card issuer's host system. In some cases, these features may be enabled by the use of an embedded chip. The cloning of the EMV-enabled chip is not feasible compared with magnetic stripe-based cards. However, one drawback of the current EMV Card implementation is it necessitates a specialized card reader or terminal to communicate with the chip. With the two-way communication interfacing technology described herein, a payment card may be able to communicate with a common touchscreen device for the same purpose. This increases the choice of usable card readers and brings benefits to consumers and merchants.

In another example, electronic card 200 may be used as a token card. With devices like the RSA token, a human user may need to type a unique security code into the system being logged into. This may result in a sub-optimal user experience. The two-way communication interface embedded in electronic card 200 may enables the simple action of touching the token against the touchscreen. The unique code may be automatically transmitted to the touchscreen device, thereby greatly shortening the input time needed. Example embodiments include crypto hardware wallets, which can benefit from two-way communication by requiring a physical tap against a touchscreen, enhancing security and convenience, in turn invoking a transaction response from the touchscreen via light.

In another example, electronic card 200 may be used in toys and games (e.g., by being used as or embedded within a game piece). In some smart toys, each figure can be designed to contain memory about how it was used in a previous game and retains that memory for future games. Additional novel interactions are enabled by two-way communication, whereby each figure can be programmed to perform an action (haptic feedback, flashing lights) based on the response from the touchscreen transmitted to the figure. How the figure moves (both position and orientation) along the touchscreen can also invoke unique responses from the touchscreen transmitted to the figure.

In yet another example, electronic card 200 may be used as an object-to-device interface. That is, two-way communication paves the way to turn a touchscreen into a generic object-to-device communication interface. Take pairing two smart devices using Bluetooth for example. Traditionally, pairing Bluetooth devices requires the searching for nearby Bluetooth devices and identifying the target device's ID in order to instruct the host device to pair with it. This necessitates the knowledge of the target device's ID even though the two devices may be already physically next to each other. With the two-way communication technology, users may simply touch one device against the touchscreen of the other, and the handshaking and confirmation will be done automatically through this channel. This may be particularly useful when the two devices were not previously registered with each other, and especially when one or both devices are not equipped with other types of communication capabilities, like NFC or a camera. The existence of two-way communication enables automatic registration and immediate pairing and the device-to-device collaboration.

Figure 3A:
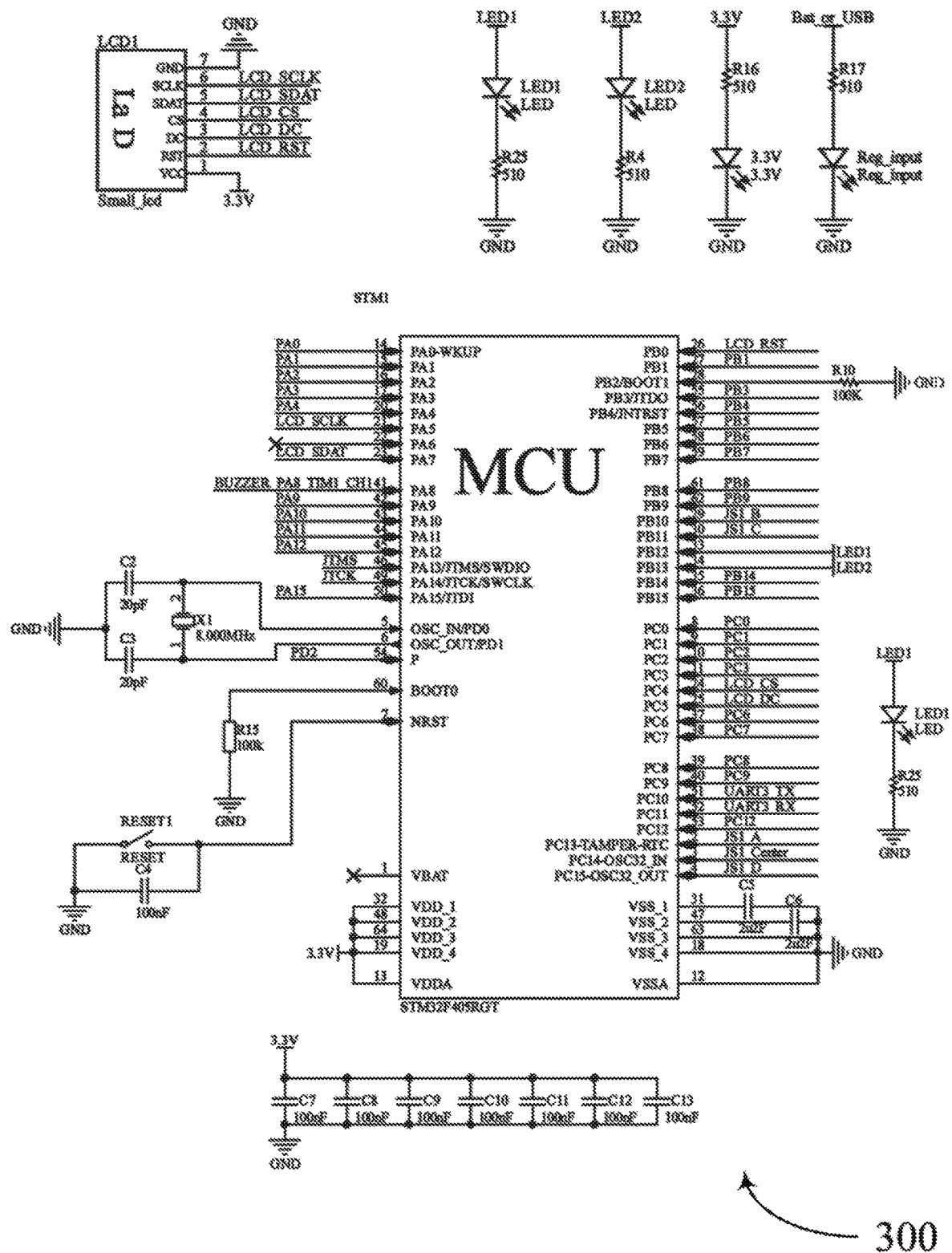
FIGS. 3A and 3B show an example of a circuit diagram of a top printed circuit board (PCB) of an electronic card in accordance with aspects of the present disclosure.
Figure 3B:
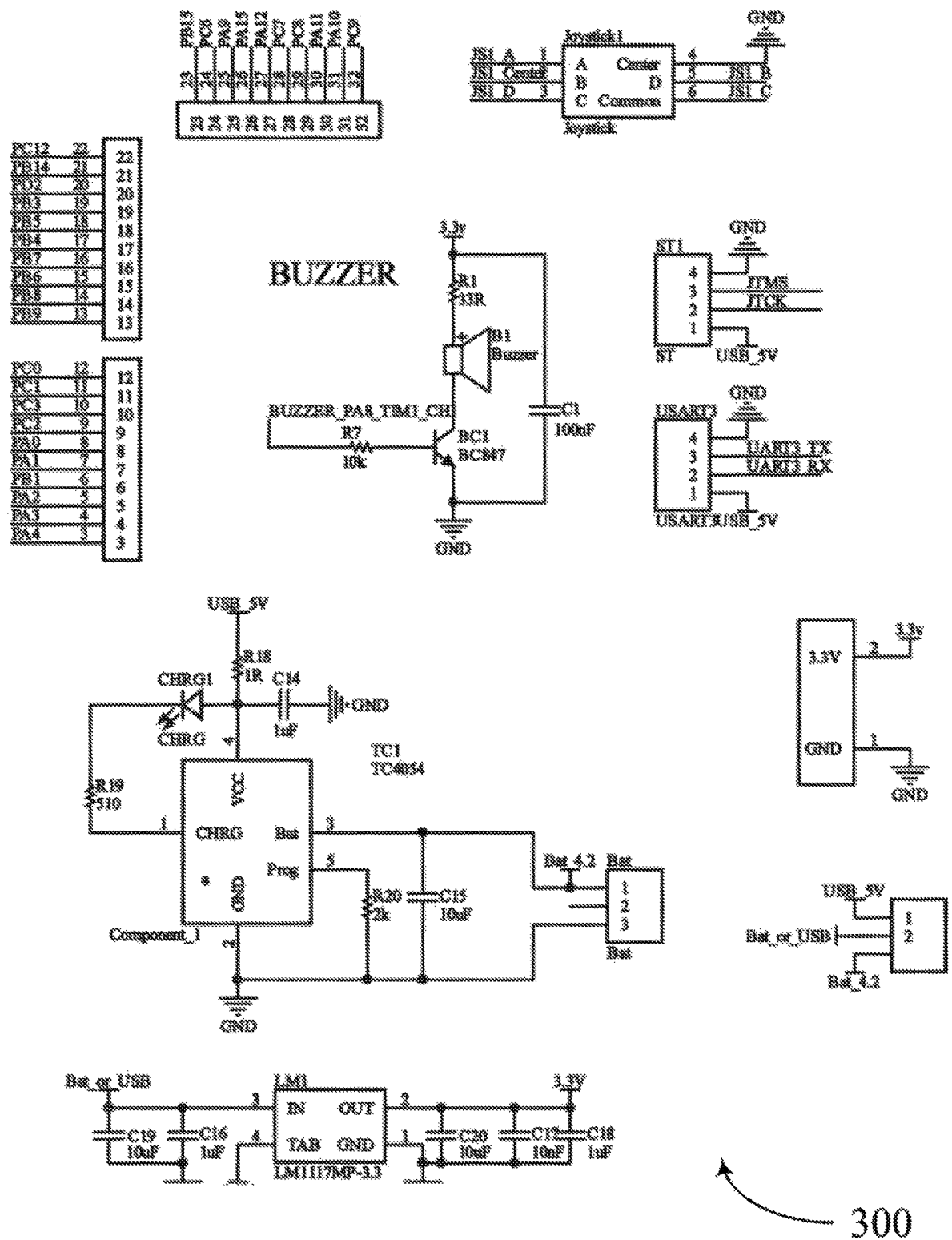

FIGS. 3A and 3B show an example of a circuit diagram of a top printed circuit board (PCB) of an electronic card 300 in accordance with aspects of the present disclosure. Electronic card 300 may be an example of, or include aspects of, the corresponding elements described with reference to FIGS. 1, 2, 4A, 4B and 4C.

Figure 4A:
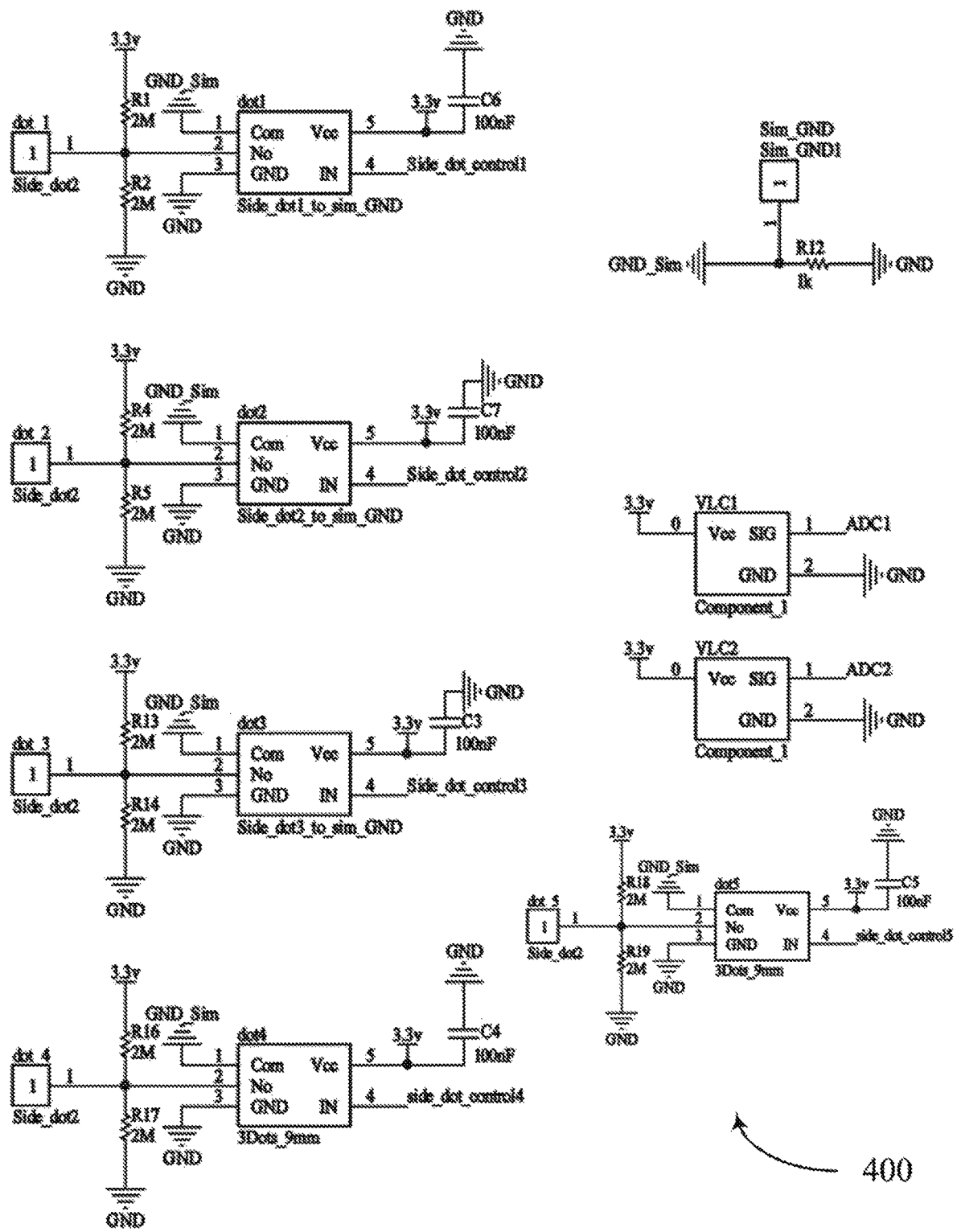
FIGS. 4A, 4B and 4C show an example of a circuit diagram of a bottom PCB of an electronic card in accordance with aspects of the present disclosure.
Figure 4B:
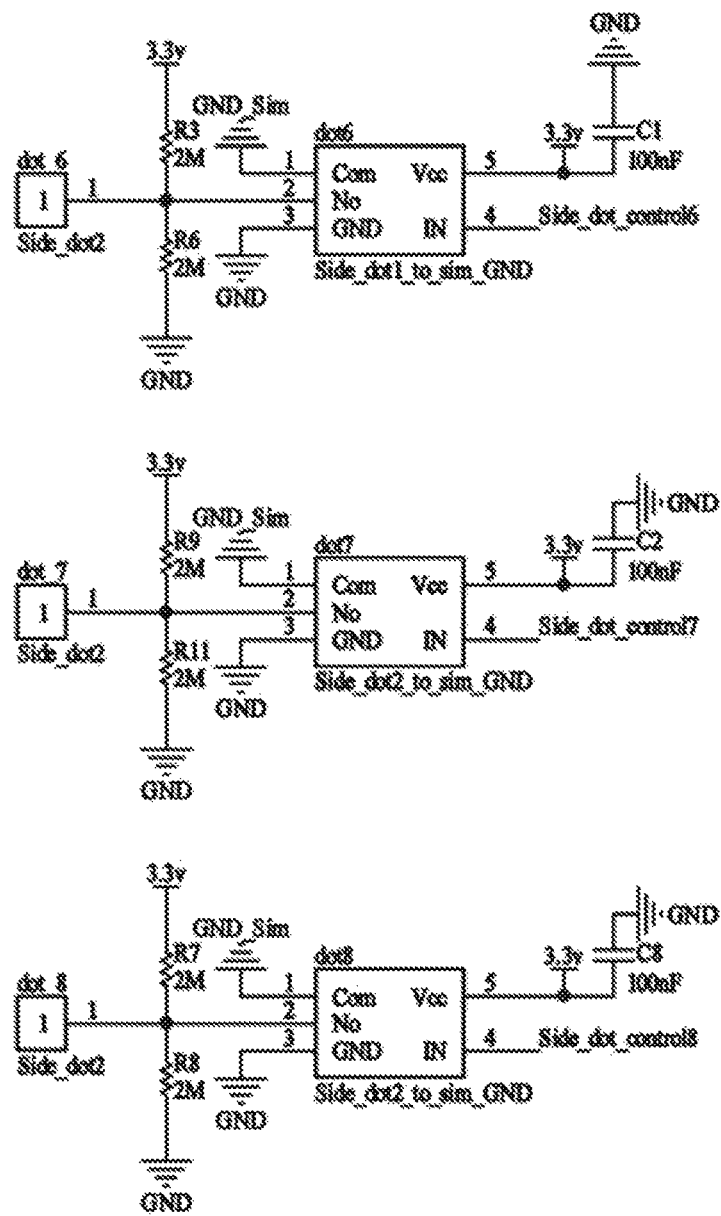
Figure 4C:
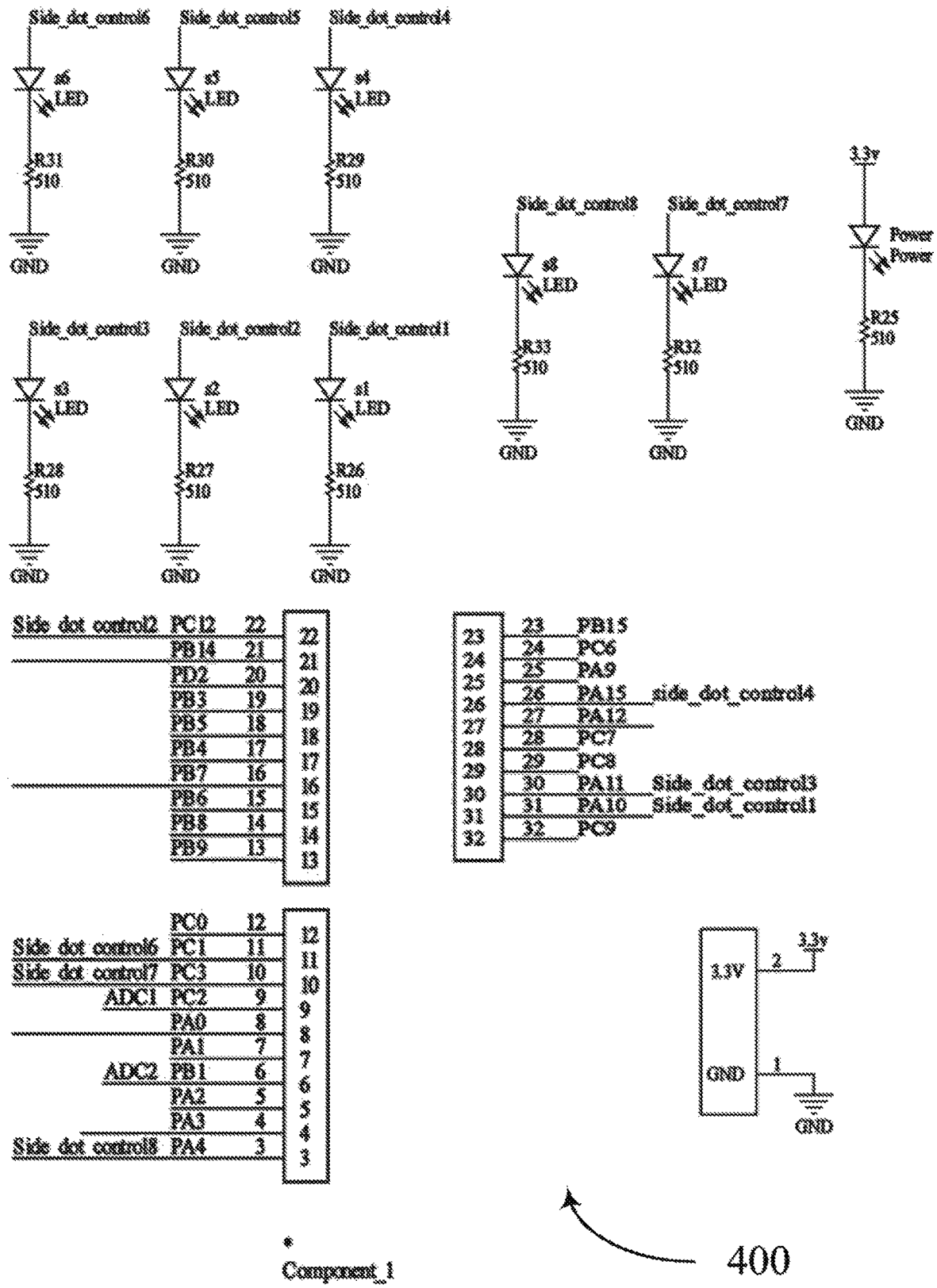

FIGS. 4A, 4B and 4C show an example of a circuit diagram of a bottom PCB of an electronic card 400 in accordance with aspects of the present disclosure. Electronic card 400 may be an example of, or include aspects of, the corresponding elements described with reference to FIGS. 1, 2, 3A and 3B.

Figure 5:
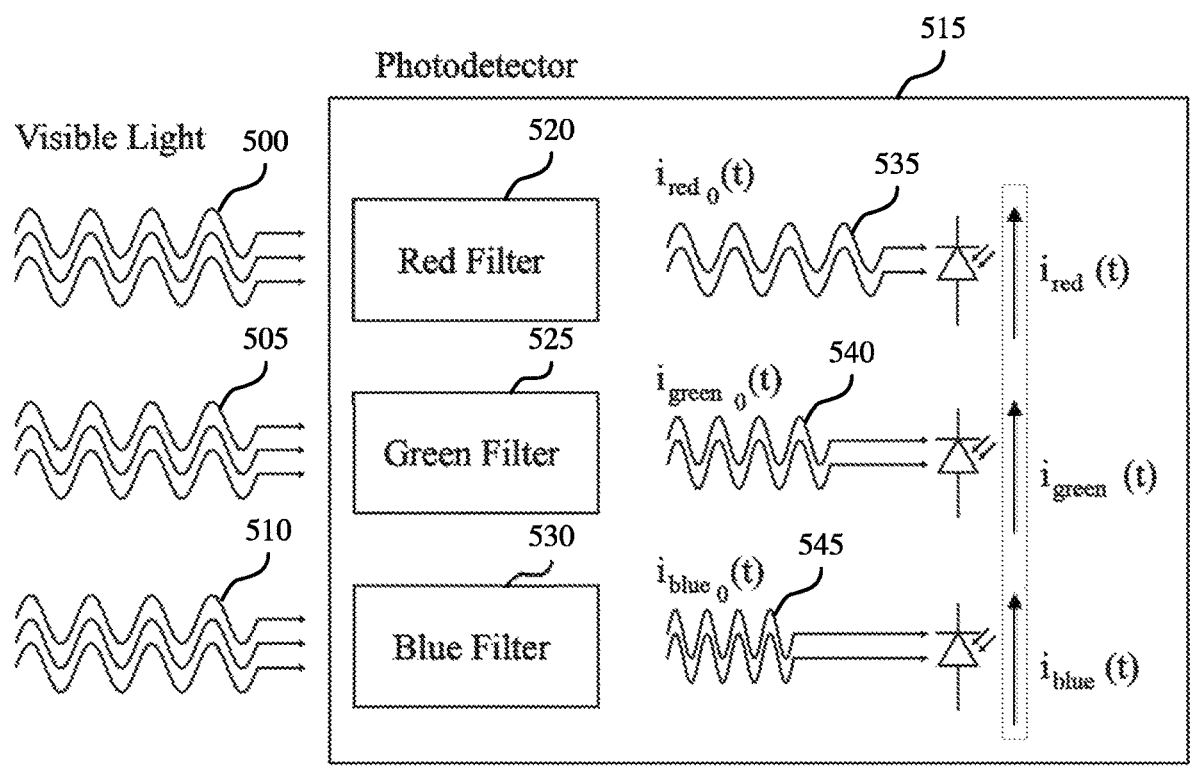
FIG. 5 shows an example of a diagram of parallel communication under different wavelengths between photodetectors and a touchscreen device in accordance with aspects of the present disclosure.

FIG. 5 shows an example of a diagram of parallel communication under different wavelengths between photodetectors 515 and a touchscreen device in accordance with aspects of the present disclosure. The example shown includes red light 500, green light 505, blue light 510, photodetector 515, red signal 535, green signal 540, and blue signal 545.

Photodetector 515 may be an example of, or include aspects of, the corresponding elements described with reference to FIGS. 1 and 2. Photodetector 515 may include red filter 520, green filter 525, and blue filter 530. Red signal 535, Green signal 540, and Blue signal 545 may be an example of, or include aspects of, the corresponding elements described with reference to FIG. 6.

According to an embodiment of the present disclosure, a touchscreen device such as the one described with reference to FIG. 1 may transmit a signal to an electronic card using red light 500, green light 505, blue light 510. The electronic card may include photodetector 515, which may receive the signal and filter out different channels using red filter 520, green filter 525, and blue filter 530, to create red signal 535, green signal 540, and blue signal 545.

Figure 6:
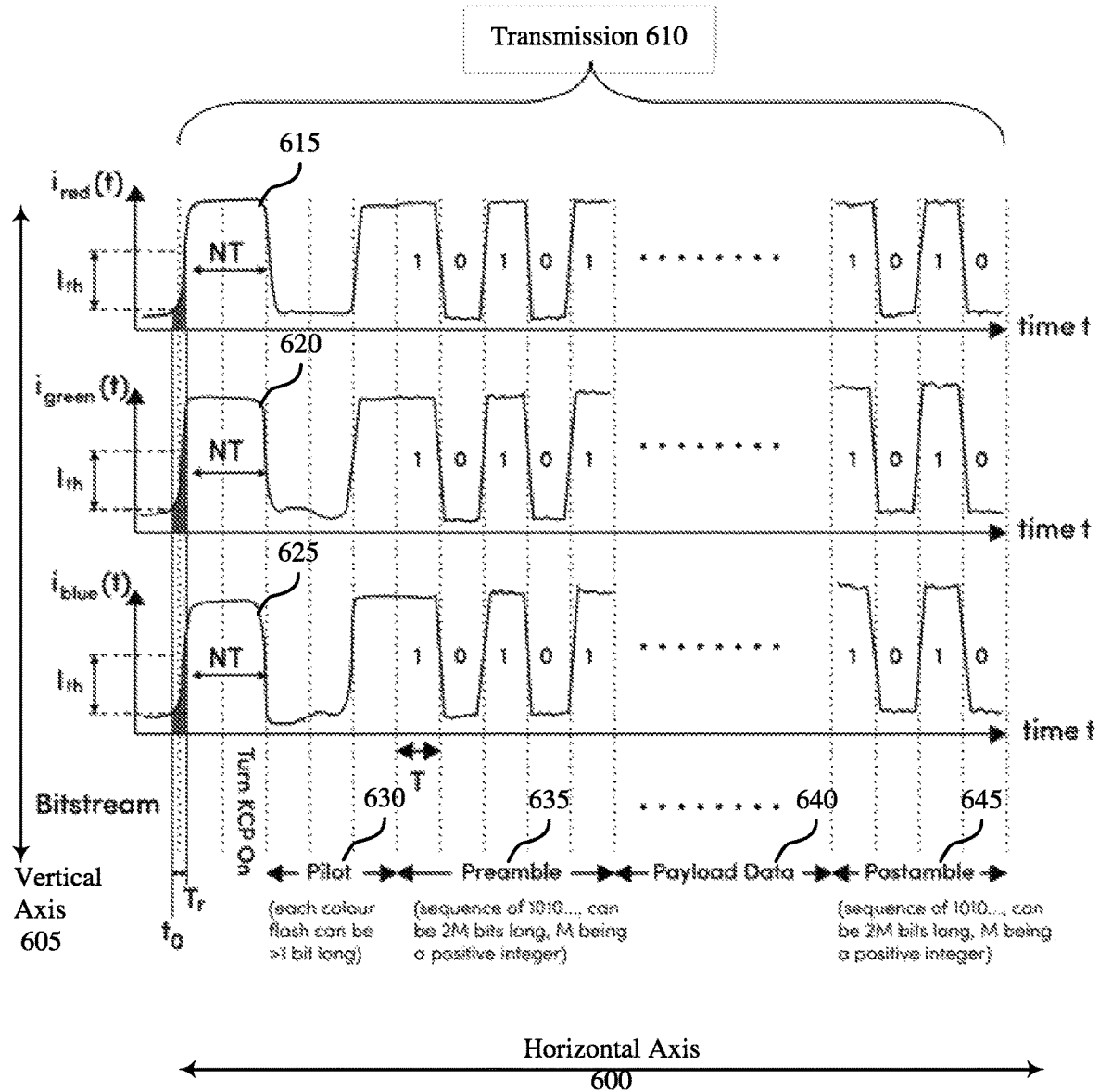
FIG. 6 shows an example of a diagram of current waveforms of photodetectors that read lights from a touchscreen device in accordance with aspects of the present disclosure.

FIG. 6 shows an example of a diagram of current waveforms of photodetectors that read lights from a touchscreen device in accordance with aspects of the present disclosure. The example shown includes horizontal axis 600 representing the time dimension, t, vertical axis 605 representing signal current, i (broken into three segments representing red blue and green signals), and transmission 610. Transmission 610 may include red signal $i_{red}$ 615, green signal $i_{green}$ 620, blue signal $i_{blue}$ 625, each of which may include pilot 630, preamble 635, payload 640, and postamble 645. Red signal 615, green signal 620 and blue signal 625 may be an example of, or include aspects of, the corresponding elements described with reference to FIG. 5.

By way of example, consider a card that includes N photodetectors, each consisting of three photodiodes that can read red, green and blue light independently. Each light color is a unique optical communication channel. The three photodiodes convert incoming lights of different colors into an electrical current denoted $y=i_{color}(t)$, where color stands for red, green and blue.

The photodetectors on the card may initially be in passive mode to save energy and may be activated by specific waveform patterns. For example, the photodetector may first identify samples at $t_0$ such that:

$$i(t_0+T_r)-i(t_0)>I_{th},$$

where i is the signal current (i.e. $i_{red}$; $i_{green}$ or $i_{blue}$) as a function of time, $t_0$ is an onset time for the rising edge, $T_r$ is a response delay time, and $I_{th}$ is a threshold signal current. Then, if the signal satisfies the inequality given below, the photodetector may be activated if:

$$i(t_0+NT)-i(t_0+NT+T_r)>I_{th}.$$

where T is the symbol time period and N is a positive integer. And $t_0+NT$ is the onset time for the falling edge.

The resulting signal may comprise a series of bits corresponding to alternating flashes of light, which have been converted to an electrical current by the photodetector. After the activation signal is transmitted, the pilot 630, preamble 635, payload 640 data, and postamble 645 symbols may be sent.

In some examples, the pilot 630 may flash between red, green, and blue colors, with a duration of each color being longer than 1 bit, to mitigate multi-color crosstalk between the different channels. That is, photodiodes are not perfect and may generate drift current from other wavelengths of lights, modelled by the equation:

$$\begin{bmatrix} i_{green} \\ i_{blue} \\ i_{red} \end{bmatrix} = \begin{bmatrix} C_{11} & C_{12} & C_{13} \\ C_{21} & C_{22} & C_{23} \\ C_{31} & C_{32} & C_{33} \end{bmatrix} \begin{bmatrix} i_{green0} \\ i_{blue0} \\ i_{red0} \end{bmatrix},$$

where $i_{color0}$ are raw light signals sent from the touchscreen device, and $C_{ij}$ are sensitivity coefficients from each photodiode. By sending each color sequentially, the drift current can be obtained. The bit error rate of the communication system can be reduced based on the obtained drift current.

As one example, the preamble 635 and postamble 645 (both are sequences of 1010 . . . , can be either 4 or 8 bits long) synchronizes and adjusts for any timing differences between the photodetectors. The preamble 635 tells the photodetectors when the actionable data or payload 640 data will be sent, and the postamble 645 tells the photodetectors when the data has been stopped and hence the photodetectors can turn off to save energy. Light pulses emitted to each photodiode do not have to be binary but can be modulated to represent N bits on each light pulse, where N is an integer more than one. On top of preamble and postamble timing synchronization, other standard pulse/frame sync procedures across signals from different photodiodes will also be used. With two-way communication established, encryption algorithms can be implemented in the communication protocol between the card and touchscreen device, which can be applied in the following applications.

Figure 7:
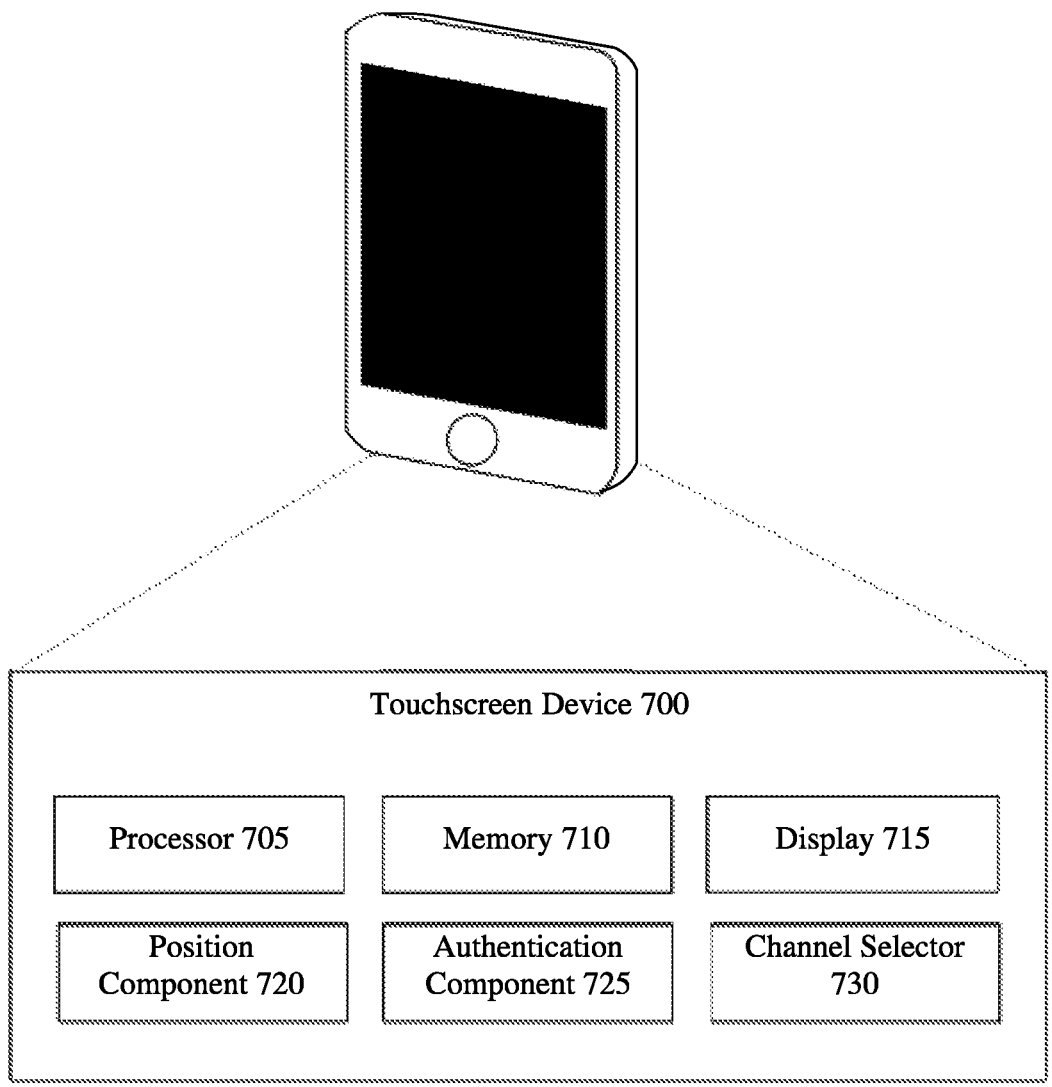
FIG. 7 shows an example of a touchscreen device in accordance with aspects of the present disclosure.

FIG. 7 shows an example of a touchscreen device 700 in accordance with aspects of the present disclosure. Touchscreen device 700 may be an example of, or include aspects of, the corresponding elements described with reference to FIG. 1. Touchscreen device 700 may include processor 705, memory 710, display 715, position component 720, authentication component 725, and channel selector 730.

Display 715 may be a touchscreen component that may transmit a visible light signal to an electronic card based at least in part on the position of a photodetector. Display 715 may also receive a response signal via one or more conductive touchpoints based on transmitting the visible light signal. Display 715 may also transmit a subsequent visible light signal to the photodetector, wherein the subsequent visible light signal comprises an indication of the one or more preferred communication channels. In some examples, the visible light signal comprises a series of light flashes corresponding to bits of information, and may also include a pilot part, a preamble, a data payload, a postamble, or any combination thereof as described with reference to FIG. 6. In some examples, the visible light signal comprises a blue light channel, a red light channel, and a green light channel.

Position component 720 may identify a position of one or more conductive touchpoints of the electronic card. Position component 720 may also determine the position of a photodetector of the electronic card based at least in part on the position of the one or more conductive touchpoints. Position component 720 may determine the position of at least one additional photodetector based at least in part on the position of the one or more conductive touchpoints, when the visible light signal comprises a first part directed toward the photodetector and a second part directed toward the at least one second photodetector.

Identifying the position of the one or more conductive touchpoints may include identifying the position of three or more conductive touchpoints arranged in a pattern as described above. Position component 720 may identify an expected touchpoint pattern and compare the identified position of the three or more conductive touchpoints to the expected touchpoint pattern. Position component 720 may also determine an orientation of the photodetector based at least in part on the position of the one or more conductive touchpoints. In one embodiment, the expected touchpoint pattern are the positional patterns of the anchor points 120 as shown in FIG. 1.

Authentication component 725 may perform an authentication procedure based at least in part on the response signal from the electronic card. Channel selector 730 may identify one or more preferred communication channels based at least in part on the response signal. Channel selector 730 may then communicate the preferred communication channels to the electronic card via the display 715 (e.g., using visible light signals).

The touchscreen device 700 may also include a controller or processor that communicates with a pattern recognizer, a memory, a user interface and an input/output (I/O) system. By way of example, the pattern recognizer reads the patterns formed on the surface of the substrate when the substrate is in contact with or adjacent to the touchscreen display 715. In an example embodiment, the user interface displays data or images associated with the card or applications authorized or executed upon reading the substrate.

Figure 8:
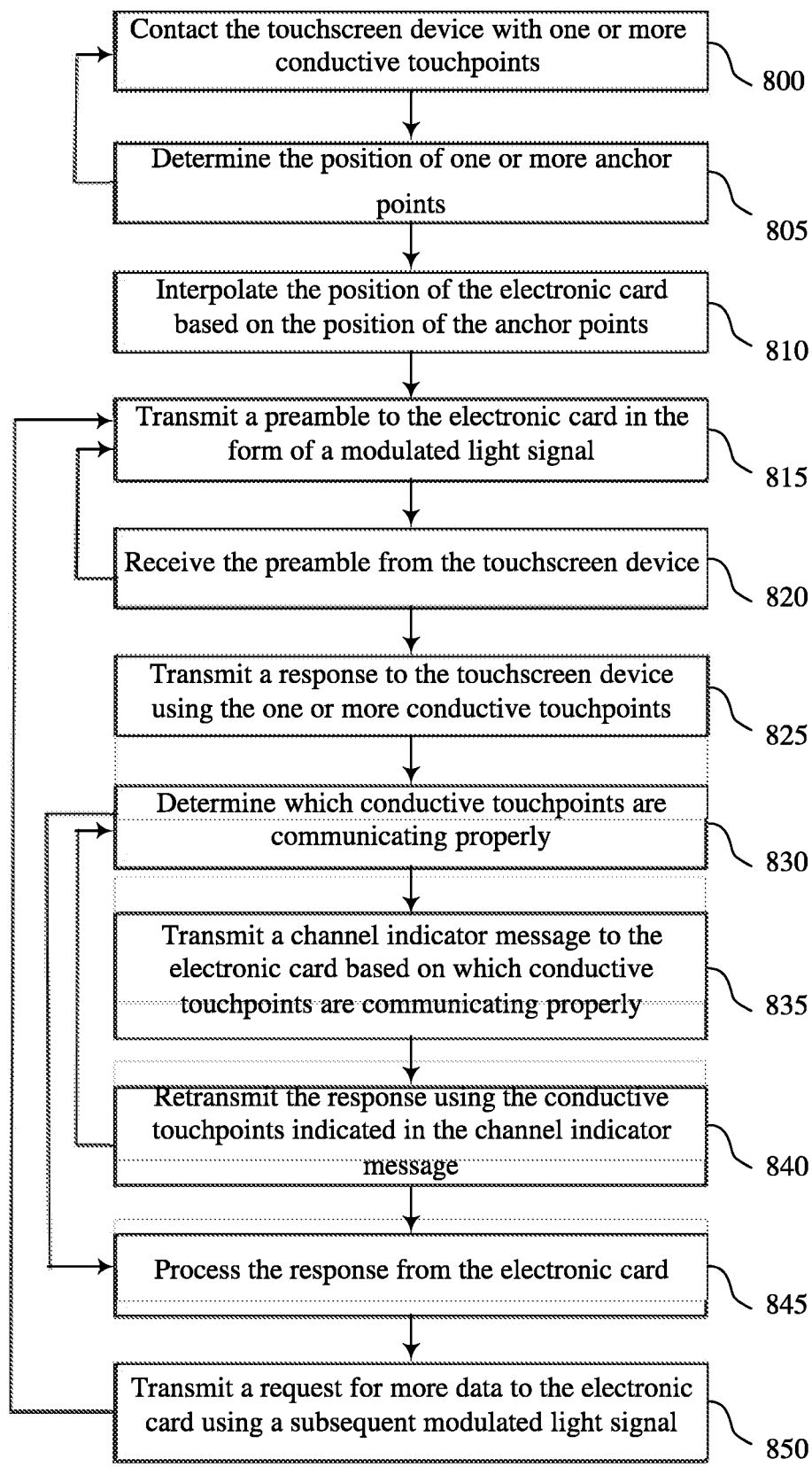
FIG. 8 shows an example of a process for bi-directional communication between an electronic card and a touchscreen device in accordance with aspects of the present disclosure.

FIG. 8 shows an example of a process for bi-directional communication between an electronic card and a touchscreen device in accordance with aspects of the present disclosure. In some examples, these operations may be performed by an electronic card and a touchscreen device executing a set of codes. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At step 800, an electronic card may contact the touchscreen device with one or more conductive touchpoints, which may include anchor points and conductive touchpoints used for communication. In some cases, the operations of this step may refer to, or be performed by, a conductive touchpoint as described with reference to FIG. 2.

At step 805, a touchscreen device may determine the position of one or more anchor points. If the position of a sufficient number of anchor points cannot be determined, the process may return to step 800. In some cases, the operations of this step may refer to, or be performed by, a position component as described with reference to FIG. 7.

At step 810, the touchscreen device may interpolate the position of the electronic card based on the position of the anchor points. In some cases, the operations of this step may refer to, or be performed by, a position component as described with reference to FIG. 7.

At step 815, the touchscreen device may transmit a preamble to the electronic card in the form of a modulated light signal. In some cases, the operations of this step may refer to, or be performed by, a display as described with reference to FIG. 7.

At step 820, the electronic card may receive the preamble from the touchscreen device. If the preamble is not properly received, the electronic card may send an indication to the touchscreen device (not shown) and the process may return to step 815. In some cases, the operations of this step may refer to, or be performed by, a photodetector as described with reference to FIGS. 1, 2, and 5.

At step 825, the electronic card may transmit a response to the touchscreen device using the one or more conductive touchpoints. In some cases, the operations of this step may refer to, or be performed by, a conductive touchpoint as described with reference to FIG. 2.

At step 830, the touchscreen device may determine which conductive touchpoints are communicating properly. If a sufficient number of touchpoints are communicating properly, the process may proceed to step 845. In some cases, the operations of this step may refer to, or be performed by, a channel selector as described with reference to FIG. 7.

At step 835, the touchscreen device may transmit a channel indicator message to the electronic card based on which conductive touchpoints are communicating properly. In some cases, the operations of this step may refer to, or be performed by, a display as described with reference to FIG. 7.

At step 840, the electronic card may retransmit the response using the conductive touchpoints indicated in the channel indicator message. In some cases, the process may return to step 830 to further refine the communication channels being used. In some cases, the operations of this step may refer to, or be performed by, a conductive touchpoint as described with reference to FIG. 2.

At step 845, the touchscreen device may process the response from the electronic card. In some cases, the operations of this step may refer to, or be performed by, a processor as described with reference to FIG. 7.

At step 850, if more data is needed, the touchscreen device may transmit a request for more data to the electronic card using a subsequent modulated light signal. In this case, the process may return to step 815 (as the position of the electronic card may already be known). In other cases, the positioning process, or a position refinement process may be performed again. In some cases, the operations of this step may refer to, or be performed by, a display as described with reference to FIG. 7.

Figure 9:
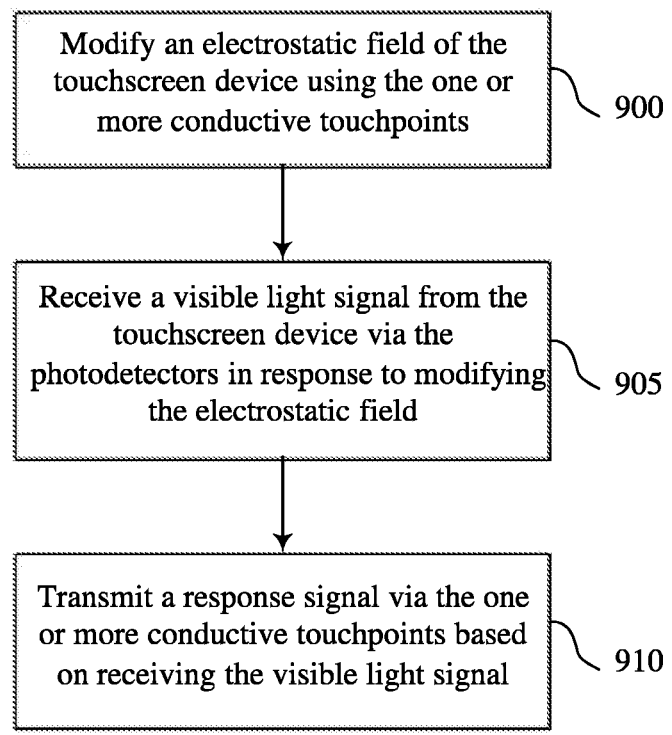
FIG. 9 shows an example of a process for communicating with a touchscreen device in accordance with aspects of the present disclosure.

FIG. 9 shows an example of a process for communicating with a touchscreen device in accordance with aspects of the present disclosure. In some examples, these operations may be performed by an electronic card executing a set of codes. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At step 900, an electronic card may modify an electrostatic field of the touchscreen device using the one or more conductive touchpoints. In some cases, the operations of this step may refer to, or be performed by, a conductive touchpoint as described with reference to FIG. 2.

At step 905, the electronic card may receive a visible light signal from the touchscreen device via the photodetector in response to modifying the electrostatic field. In some cases, the operations of this step may refer to, or be performed by, a photodetector as described with reference to FIGS. 1, 2, and 5.

At step 910, the electronic card may transmit a response signal via the one or more conductive touchpoints based on receiving the visible light signal. In some cases, the operations of this step may refer to, or be performed by, a conductive touchpoint as described with reference to FIG. 2.

Figure 10:
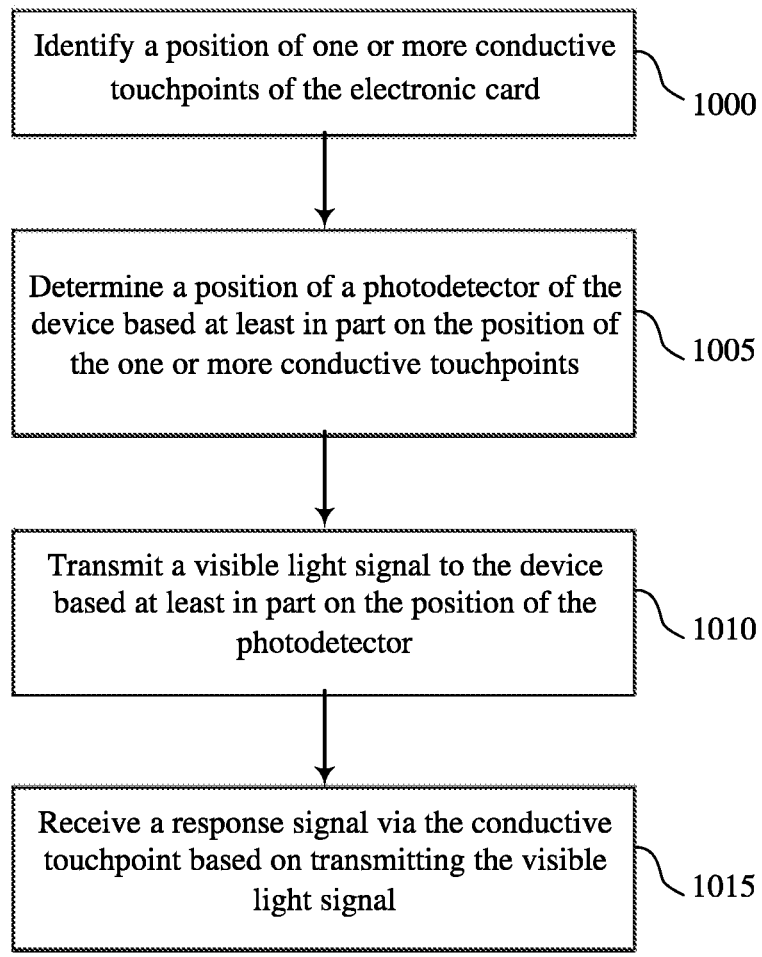
FIG. 10 shows an example of a process for communicating with an electronic card in accordance with aspects of the present disclosure.

FIG. 10 shows an example of a process for communicating with an electronic card in accordance with aspects of the present disclosure. In some examples, these operations may be performed by a touchscreen device executing a set of codes to control functional elements of the apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At step 1000, a touchscreen device may identify a position of one or more conductive touchpoints of the electronic card. In some cases, the operations of this step may refer to, or be performed by, a position component as described with reference to FIG. 7.

At step 1005, the touchscreen device may determine a position of a photodetector of the electronic card based at least in part on the position of the one or more conductive touchpoints. In some cases, the operations of this step may refer to, or be performed by, a position component as described with reference to FIG. 7.

At step 1010, the touchscreen device may transmit a visible light signal to the electronic card based at least in part on the position of the photodetector. In some cases, the operations of this step may refer to, or be performed by, a display as described with reference to FIG. 7.

At step 1015, the touchscreen device may receive a response signal via the one or more conductive touchpoints based on transmitting the visible light signal. In some cases, the operations of this step may refer to, or be performed by, a display as described with reference to FIG. 7.

Figure 11:
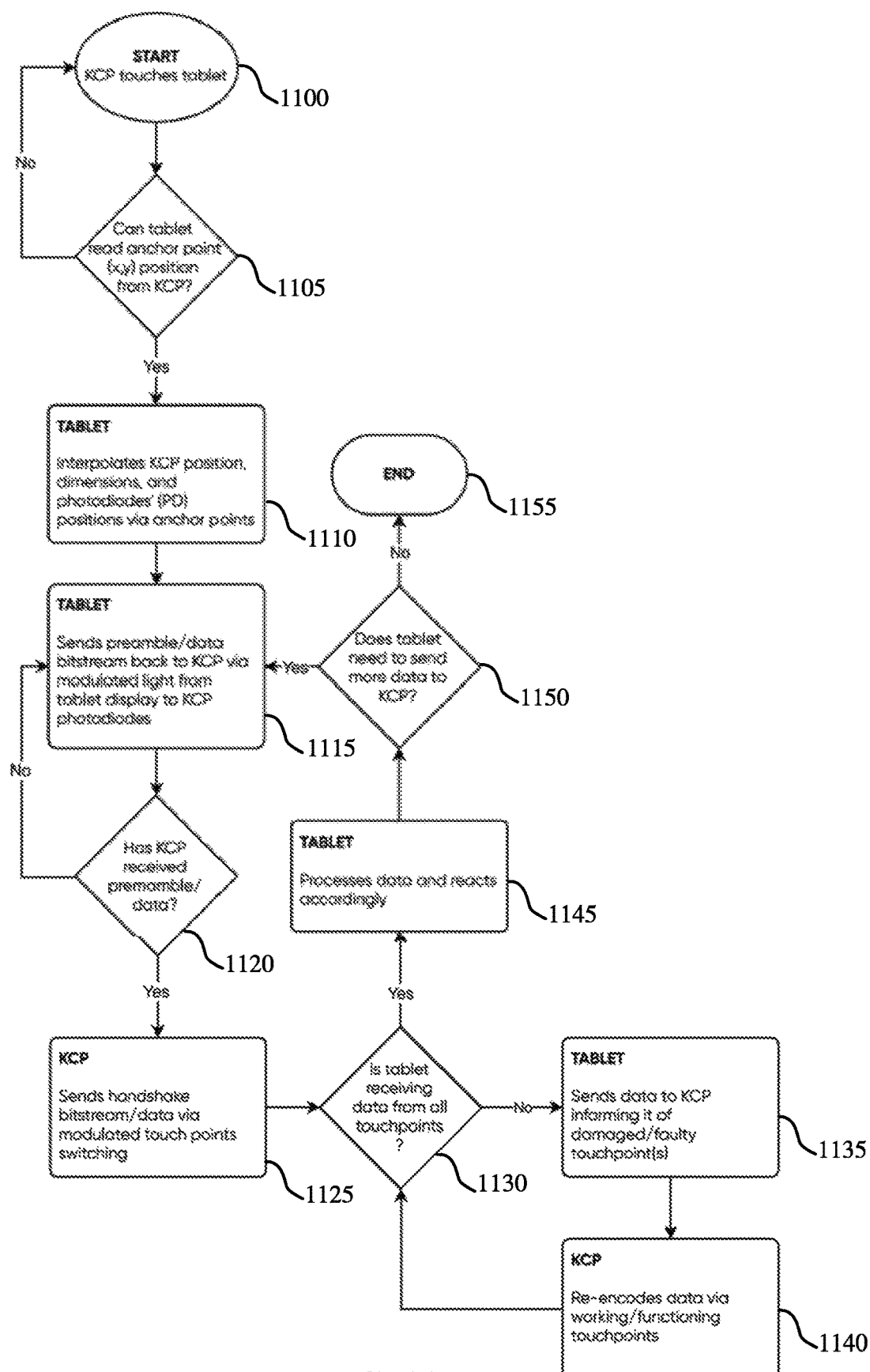
FIG. 11 shows another embodiment of a process for bi-directional communication between an electronic card and a touchscreen device in accordance with aspects of the present disclosure.

FIG. 11 shows another embodiment of a process for bi-directional communication between an electronic card and a touchscreen device in accordance with aspects of the present disclosure. In some examples, these operations may be performed by a touchscreen device (referred to as a tablet) and an electronic card (referred to as a KCP) executing a set of codes to control functional elements of the apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At step 1100, the process begins when the KCP touches the tablet. At step 1105, the tablet determines whether it can read the anchor points (e.g., the x, y position) from the KCP. If so, the process may proceed to 1110. If not, the process may return to step 1100.

At step 1110, the tablet interpolates the KCP position and the photodiode positions via the anchor points. At step 1115, the tablet send a preamble and data bitstream back to the KCP via a modulated light signal from the tablet display to the KCP photodiodes.

At step 1120, the KCP determines whether it has received the preamble and/or data. If so, the process may proceed to step 1125. If not, the process may return to step 1115 (e.g., the KCP may send a request for retransmission).

At step 1125, the KCP may send a handshake bitstream (which may include data) to the tablet (e.g., via modulated touchpoints switching). At step 1130, the tablet may determine whether it is receiving data from all touchpoints. If so, the process may proceed to step 1145. Otherwise, the process may proceed to step 1135.

At step 1135, the tablet may send data to the KCP informing it of any damaged or faulty touchpoints. At step 1140, the KCP may re-encode the data via the functioning touchpoints. The process may then return to step 1130.

At step 1145, the tablet may process the data received from the KCP and respond to the transmission, if appropriate. At step 1150, the tablet may determine whether it needs to send more data to the KCP (or receive more data from the KCP). If so, the process may return to step 1115. If not, the process may be completed at step 1155.

An example of a communication protocol between the KCP and the touchscreen device is described below. For the purposes of explaining the protocol, the multiple photodetectors or visual light communication (VLC) sensors at the KCP are denoted as:

$$VLC_i, \text{where } i=1,2,3,\ldots N$$

where N is a positive integer, and the luminance readings L of the VLC sensors are denoted as:

$$L_j, \text{where } j=1,2,3,\ldots N$$

The VLC sensors face towards the touch screen when the KCP is in contact with the touchscreen. There are multiple configurable touch points on the KCP, classified into two categories, namely (1) anchor points and (2) info points as described in reference to FIG. 2. The touch points are selectively turned on or off when the KCP is in contact with the touchscreen. The anchor points AP and info points DP are denoted as:

$$AP_x, \text{where } x=1,2,3,\ldots K_{AP}$$

$$DP_x, \text{where } x=1,2,3,\ldots K_{DP}$$

where $K_{AP}$ and $K_{DP}$ are both positive integers. The anchor points are touchpoints for KCP pattern recognition on the touchscreen, and the info points are touchpoints for KCP data transmission.

The microprocessor inside the KCP executes a software program resided in the microprocessor memory that directs the KCP to go through a set of states. The touchscreen device also runs a corresponding application software that interacts with the KCP in response to the signals sent by the KCP at various states.

When the KCP is under storage or not in use, the KCP is in a SLEEP state. The VLC sensors have a static reading $L_{env}$ based on surrounding environment. The KCP is configured to sleep to reduce power consumption, and wake up based on a change in reading the surrounding luminance $L_{env}$ (for example when $L_{env} > L_{threshold}$). In one embodiment, the sensors can be activated by receiving an activation signal. If the anchor points are not static (always ON), they are configured or set to the ON state, meaning that the electrostatic field modification is activated when the KCP is placed on the touchscreen.

Since a photodetector generates a current which is proportional to the luminance that it receives, monitoring if $L_{env} > L_{threshold}$ is actually performed by monitoring if $i_{env} > i_{threshold}$, where $i_{env}$ is the current generated by the photodetector. In this disclosure, whenever luminance measurement is mentioned, photodetector current can be used instead and vice versa. In a practical environment, $i_{env}$ may drift slowly due to variations of the environmental lighting condition, multi-color crosstalk between different channels, the device characteristics of the photodetector and other factors. On the other hand, when the photodetector receives light signals flashing from the touchscreen device, the photodetector current, $i_{signal}$ is substantially stronger and fast-moving than $i_{env}$, as shown in 615, 620 and 625 of FIG. 6.

When the event $L_{env} > L_{threshold}$ is detected, the KCP enters into a WAKED state and an internal clock in the KCP is started. The software program in the KCP has a timeout module that when executed, continuously monitors the activities of the KCP. If there is no interaction between the KCP and a touchscreen device for a period longer than a time out threshold $T_{timeout}$, the KCP will go back to sleep. This applies to any operation state of the KCP which ensures the KCP go back to the power-saving SLEEP state even if the data transfer is not successful or stuck in a loop.

At the WAKED state of the KCP, it generates signals to send out from the anchor points by modulating the electrostatic fields around the anchor points. When it is placed in proximity on a touchscreen device, the application software running on the touchscreen device detects the changes of the electrostatic field and recovers the signals. Based on the locations of these signals, the positions of the KCP anchor points relative to the touchscreen are determined. The anchor points' pattern is then recognized, and the positions of the VLC sensors and the info points are obtained relative to the anchor points. The touchscreen device then starts to synchronize with the KCP by flashing a special light pattern on the VLC sensors.

In one example, the touchscreen device sends a message consisting of a sequence of signals as depicted in FIG. 6 at the locations in the vicinities of KCP photodetectors. Meanwhile, the KCP enters the SYNC state. At the SYNC state, the KCP clock is synchronized and aligned with the touchscreen clock. Firstly, the KCP analyses the preamble signal 635 in FIG. 6. At least a first timestamp of the rising edge and falling edge pair and a second timestamp of the rising edge and falling edge pair of the VLC sensors are recorded. By way of example, the rising edge is the time $t_0$ as depicted in eq. (1) and the falling edge is the time $(t_0+NT)$ as depicted in eq. (2). Afterwards, a starting or first sampling time is then calculated based on the recorded timestamp pairs, thereby synchronizing or aligning the touchscreen clock and the KCP clock. In another example, more than two rising edge and falling edge pairs may be used, and the clock synchronization may be performed periodically to avoid clock drift.

Afterwards, the KCP examines the signal quality of the light signals received by the photodetectors. For each color, the photodetector generates a strong current $i_{ON}$ when it receives light from the touchscreen and a weak current $i_{OFF}$ when there is no light received. The difference is denoted as delta, i.e. $i_\Delta = i_{ON} - i_{OFF}$, and is a measurement of the signal quality. Another measure of signal quality is the signal-to-noise ratio (SNR), which is defined $$as = \frac{(i_{ON} - i_{OFF})^2}{4 \times \text{Average}(n^2(t))},$$

where $n^2(t)$ is the aggregate noise energy of the optical communication channel. Alternatively, the uniformity of distance between signal quantization levels at the photodetectors can be used also. These measures are related and any one, or a combination of them, can be used to gauge the signal quality. Each VLC sensor has three photodetectors detecting red, blue and green color respectively, or any combination thereof that as a whole covers most if not all of the visible light spectrum. The delta or SNR of each color, (or each set of color combination) is viewed as independent communication channel with its own SNR and delta. For each VLC sensor, the KCP ranks each optical communication channel according to its signal quality. Those channels having a higher ranking in signal quality are the preferred optical communication channels for subsequent data communication. The KCP then informs the touchscreen device in the next hand-shaking message the one or more preferred optical communication channels for subsequent processing.

In one example, those optical communication channels whose signal qualities are higher than a pre-determined threshold are the preferred optical communication channels.

In another example, the preferred optical communication channels are chosen according to the ranking order. The highest ranking channel is used most often. And the number of preferred optical communication channels to use depend on application environments. In an application where transmission speed is valued over reliability, the threshold is set to a lower value so that more optical communication channels may be used; whereas in an application where transmission reliability is valued over speed, the threshold is set higher, resulting fewer optical communication channels may be used.

In yet another example, the signal level at the payload data portion of the message may be quantized to multiple logical levels so that more bits of information can be encoded in one clock cycle. The preferred optical communication channel having a higher ranking in signal quality are used to transmit multi-level signals while the non-preferred optical communication channels are used to transmit data based on binary level encoding. This scheme is able to optimize all the VLC resources.

In a further example, the same message is sent over multiple optical communication channels (preferred and non-preferred). The KCP combines the received signals, averages out noise to obtain better signal estimate.

By way of an example, the pilot signal and/or the preamble signal are used to measure signal quality. Furthermore, white light is used for these two signals so that the system can check whether the photodetector is capable of detecting all colors. However, each red, blue, or green color channel can operate independently so in the event that if one color channel malfunction, the rest can still carry out the data communication operation.

By way of an example, every optical communication channel may have its own threshold. And the threshold may change over time. Whenever a packet of data with pilot, preamble payload and postamble is sent, the pilot and/or preamble signals may be used to re-calibrate the threshold. Hence an optical communication channel may change its preferential status over time.

Afterwards, the KCP enters the HEADER state. At a HEADER state, the KCP analyses the payload portion (payload data 635 of FIG. 6) of the visible light signal pattern. By way of an example, this portion may further include a command, message data and error checking/correcting signals. The command may include a command code, the memory address to be operated on, and other necessary information. In one example, the luminance $L_j$ of each VLC sensor is sampled based on a clock cycle T. The command code is interpreted based on the logic level. As an example, when the received luminance $L_j$ is quantized to a binary level, Bit 1 is assigned when $L_j$ is greater than a high threshold $L_{high}$, and Bit 0 is assigned when $L_x$ is below a low threshold $L_{low}$. In another embodiment, the luminance $L_j$ may be quantized to multiple logic levels. The header will be interpreted as a tuple of bits: $(b_{0,0}, b_{0,1}, \ldots, b_{0,N}, b_{1,0}, b_{1,1}, \ldots b_{1,N}, \ldots, b_{L,0}, b_{L,1}, \ldots b_{L,N})$, where L is the number of bits and N is the number of photodetectors, which means each photodetector receives a part of the header signal in parallel and is combined afterwards to obtain the final signal. In a further embodiment when the system chooses a subset of the optical communication channel as preferred channels, then N is the number of preferred channels. In an embodiment where multiple logic levels are adopted, the header may be interpreted as a tuple of symbols rather than bits, where the expression is $\{S_{0,0}, S_{0,1}, \ldots, S_{0,N}, S_{1,0}, S_{1,1}, \ldots, S_{1,N}, \ldots, S_{L,0}, S_{L,1}, \ldots S_{L,N}\}$.

By way of an example, the command code may be a READ-request, a WRITE-request, ASSIGN-temp-ID, REQUEST-temp-ID, and any other commands. The memory address at KCP to be operated on is then determined depending on the command. A READ-request is for the touchscreen device to request data from the KCP, and a WRITE-request is to write data to the KCP.

When the command code is a READ-request or WRITE-request, the KCP enters the READ-REQUEST state or the WRITE_REQUEST state respectively. At the WRITE_REQUEST state, the KCP may sample the luminance values of the photodetectors continuously to retrieve the memory address as well as the actual data to write to. At the READ_REQUEST state, the KCP may modulate the capacitances of the conductive touch points to send data at the specific memory address to the touchscreen device.

In one example, the READ-request and the WRITE-request messages are arranged according to the following data frame to modulate the visible light pattern:

| Pilot | Sync | Header | Message data and error checking/correcting bits | ACK/NACK (+ and − acknowledgement) |
| --- | --- | --- | --- | --- | where Pilot is equivalent to pilot 630, Sync is equivalent to preamble 635, Header and Message data is equivalent to payload data 640, and ACK/NACK is equivalent to postamble 645 as described in reference to FIG. 6.

By way of an example, the message data is then checked based on the error checking/correcting bits, for example but not limited to cyclic redundancy check (CRC). In the case of WRITE_REQUEST, the message data is saved into the designated address if no error is found, and retransmission is requested if error is found.

In the case of READ_REQUEST, the KCP sends a message via all info points $DP_k$. The message is encoded in a data frame that may include a pilot signal, a preamble signal, as well as a payload signal encoding the data and a postamble signal. If the pilot signal of an info point $DP_n$ is received correctly by the touchscreen, this touch channels is referred to as preferred touch communication channels. Otherwise, it is a faulty touch channel and will not be used for subsequent data communication. For faulty touch channels, the touchscreen device communicates back to the KCP indicating that they are faulty. The KCP then re-encodes the message data to other info points $DP_m$, where m≠n. The message data is saved into the designated address if no error is found, and retransmission is requested if error is found. After the read or write operation is completed, the KCP goes back to SLEEP state.

In one example, the anchor points may be reconfigured as info points after the positions of the KCP relative to the touchscreen is determined.

Figure 12:
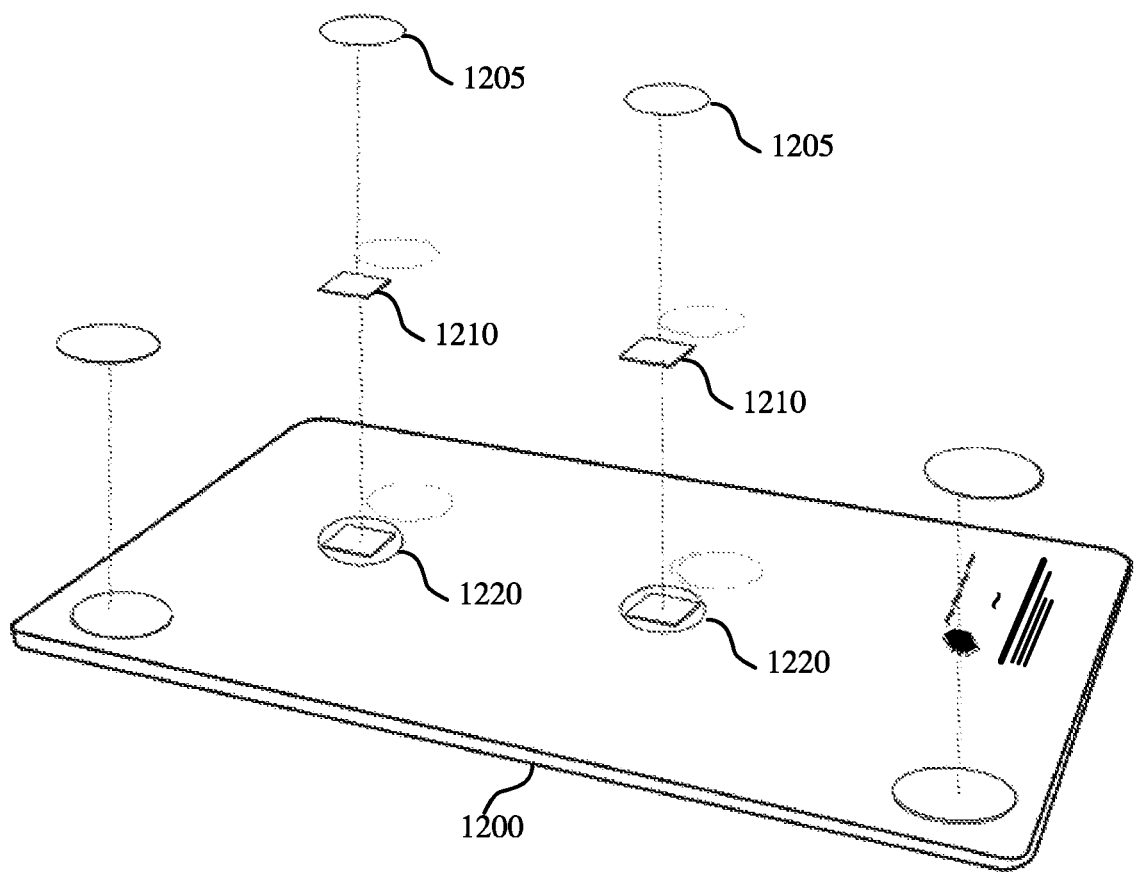
FIG. 12 shows an example of an electronic card with photodetectors overlapped to conductive points in accordance with aspects of the present disclosure.

FIG. 12 shows an example of an electronic card 1200 with photodetectors in accordance with aspects of the present disclosure. In this example, photodetectors 1210 are overlapped or axially aligned to the conductive touchpoints 1205 and both of them occupy the same spaces 1220 on the KCP. Apart from more efficient use of space of the electronic card 1200, this configuration provides multiple advantages which will be described below.

For touchscreen devices in general, a display resolution of the touchscreen is not equal to a capacitive grid resolution of the touchscreen. In most cases, the capacitive grid has a much lower resolution than the display resolution. In existing solutions, position, orientation and the size of the KCP are exclusively determined by the touchpoint locations. This means that the spatial resolution of the KCP is limited by the resolution of the capacitive grid. A potential problem that may arise is that the light pulse has to be flashed in a greater touchscreen area to ensure the photodetectors can receive the signal, which leads to increased power usage. Built-in approximation algorithms for capacitive grids may also provide a less precise positional data of the KCP. Furthermore, in situations where an anchor point is faulty, a capacitive grid of the touchscreen may be unable to interpret the position or orientation of the KCP.

In the present solution, the photodetectors of the KCP are combined with the capacitive grid of the touchscreen to determine the location of the KCP relative to the touchscreen. The touchscreen can flash a pattern of light including but not limited to varying wavelengths and/or intensities (e.g. the pattern may be a QR code). The pattern of light can be flashed within a very specific location, which for example can be smaller than a square of the capacitive grid. As such, once a photodetector picks up the pattern of light at the location, the location of the KCP relative to the touchscreen can be determined with a much higher precision.

Figure 13:
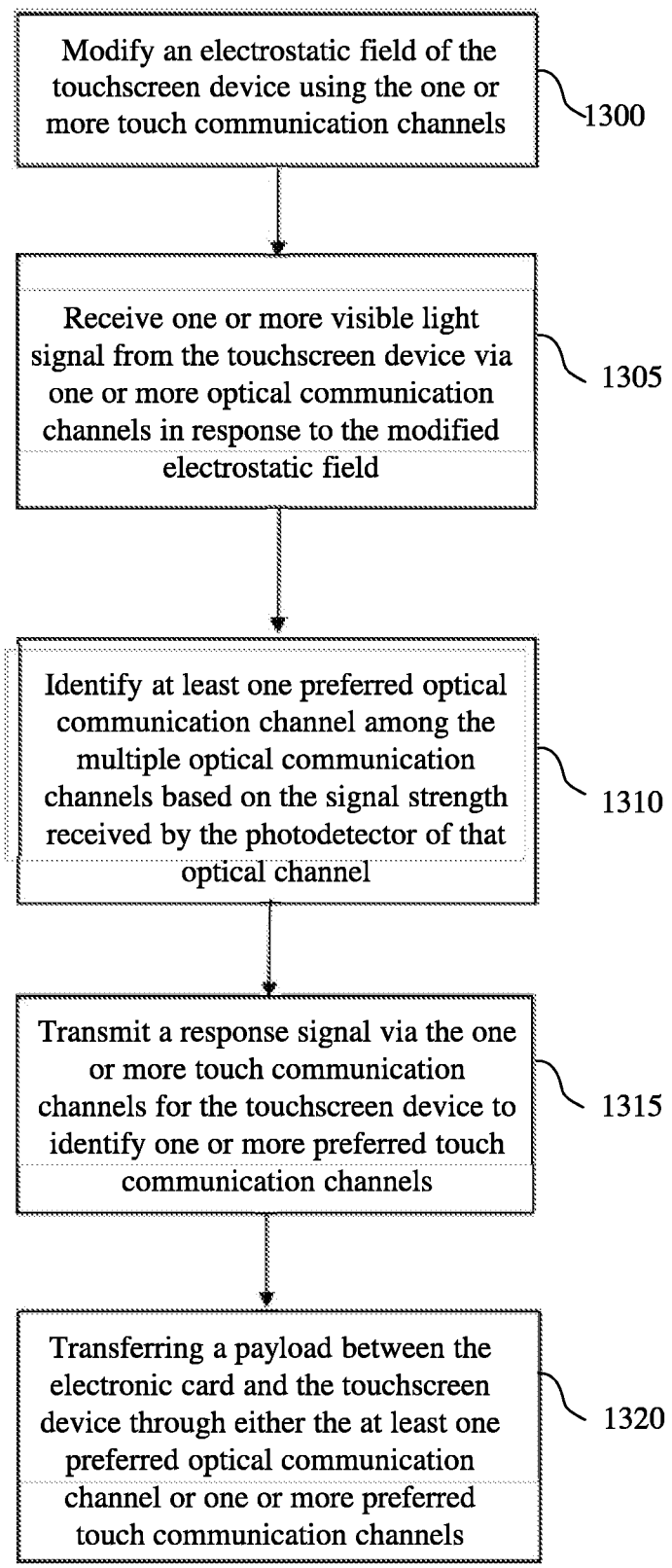
FIG. 13 shows an example of a process for bi-directional communication between an electronic card and a touchscreen device in accordance with aspects of the present disclosure.

FIG. 13 shows an example of a process for communicating with a touchscreen device in accordance with aspects of the present disclosure. In some examples, these operations may be performed by an electronic card executing a set of codes. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At step 1300, an electronic card may modify an electrostatic field of the touchscreen device using the one or more touch communication channels. In some cases, the operations of this step may refer to, or be performed by, a conductive touchpoint as described with reference to FIG. 2.

At step 1305, the electronic card may receive one or more visible light signals from the touchscreen device in response to the modified electrostatic field via one or more optical communication channels. In some cases, the operations of this step may refer to, or be performed by, a photodetector as described with reference to FIGS. 1, 2, and 3. The visible light signal comprises visible light in multiple optical communication channels having different wavelengths, such as red light, green light and blue light of FIG. 5.

At step 1310, the electronic card may identify at least one preferred optical communication channel among the multiple optical communication channels based on the signal quality received by the photodetector of that optical communication channel.

At step 1315, the electronic card may transmit a response signal via the one or more touch communication channels for the touchscreen device to identify one or more preferred touch communication channels. In some cases, the operations of this step may refer to, or be performed by, a conductive touchpoint as described with reference to FIG. 2.

At step 1320, the electronic card may transfer a payload between the electronic card and the touchscreen device through either the at least one preferred optical communication channel or one or more preferred touch communication channel. In some cases, the electronic card may receive a message data from the touchscreen device through the preferred optical communication channel, and in some cases the electronic card may transmit a message data to the touchscreen device through the preferred touch communication channel.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on".

What is claimed is:

1. A method of bi-directional communication between an electronic card and a touchscreen device, comprising:

modulating, by the electronic card, an electrostatic field of the touchscreen device using one or more touch communication channels;

receiving, by the electronic card, one or more visible light signals from the touchscreen device in response to the modified electrostatic field via one or more optical communication channels;

ranking, by the electronic card, the one or more optical communication channels according to the signal quality received from each optical communication channel;

selecting, by the electronic card, at least one optical communication channel as preferred optical communication channel based on the ranking;

transmitting, by the electronic card, a response signal via the one or more touch communication channels to indicate the at least one preferred optical communication channel to the touchscreen device; and using the at least one preferred optical communication channel and the one or more touch communication channels for subsequent bi-directional communication wherein each touch communication channel comprises a conductive touchpoint at the electronic card capable of sending signal to the touchscreen device wherein each optical communication channel comprises at least one photodetector in the electronic card capable of receiving a visible light signal from the touchscreen device.

2. The method of claim 1, whereas the signal quality is measured by any one of the following methods:

computing a delta value which is the difference between the photodetector current receiving a visible light signal from the touchscreen device and the photodetector current receiving no visible light signal from the touchscreen device;

computing the signal-to-noise ratio (SNR) of the optical communication channel determining the uniformity of distance between signal quantization levels at the photodetectors; and any combination of the above.

3. The method of claim 2 wherein the selecting step assigns those optical communication channels having a signal quality higher than a predetermined threshold as preferred optical communication channels.

4. The method of claim 3 wherein each optical communication channel has its own predetermined threshold, comprising the step of re-calibrating the predetermined threshold periodically.

5. The method of claim 1 further comprising utilizing, by the touchscreen device, multiple logic levels to transmit visual light signal through the preferred optical communication channels.

6. The method of claim 1 further comprising sending, by the touchscreen device, same message through both preferred optical communication channels and non-preferred optical communication channels, and the electronic card combining and averaging the signals received by all the optical communication channels together.

7. The method of claim 1 further comprising measuring, by the electronic card, the signal quality of an optical communication channel at the pilot signal of the visual light signals sent by the touchscreen device.

8. The method of claim 1 further comprising measuring, by the electronic card, the signal quality of an optical communication channel at both the pilot signal and the preamble signal of the visual light signals sent by the touchscreen device.

9. The method of claim 1 further comprising using white light signal for measuring signal quality.

10. The method of claim 1 further comprising using one or more preferred touch communications channel for bi-directional communication
wherein the preferred touch communication channel is a touch communication channel where the touchscreen device receives and demodulates the pilot signal sent by the electronic card without error.

11. The method of claim 1, wherein one or more photodetectors co-locate with one or more conductive touchpoints.

12. The method of claim 11, further comprising determining a position and orientation of the electronic card relative to the touchscreen device based on the one or more photodetector co-located with one or more conductive touchpoints.

13. The method of claim 1, wherein the conductive touch points comprises anchor points and info points, further comprising reconfiguring anchor points to info points after the position and orientation of the electronic card relative to the touchscreen device is determined.

14. An electronic card capable of bi-directional communication with a touchscreen device, the electronic card comprising:

one or more conductive touchpoints configured to communicate with the touchscreen device by modulating an electrostatic field of the touchscreen;

one or more photodetectors configured to receive a visible light signal from the touchscreen device; and a microcontroller connected to the conductive touchpoints, the photodetectors and to a memory storing instructions, the microcontroller being configured to execute the instructions to cause the processor to:

rank the one or more optical communication channels according to the signal quality received from each optical communication channel;

select at least one optical communication channel as preferred optical communication channel based on the ranking;

transmit a response signal via the one or more touch communication channels to indicate the at least one preferred optical communication channel to the touchscreen device; and use the at least one preferred optical communication channel and the one or more touch communication channels for subsequent bi-directional communication wherein each touch communication channel comprises a conductive touchpoint at the electronic card capable of sending signal to the touchscreen device wherein each optical communication channel comprises at least one photodetector in the electronic card capable of receiving a visible light signal from the touchscreen device.

15. The electronic card of claim 14, further comprising assigning one or more preferred touch communication channels for bi-directional communication
wherein the preferred touch communication channel is a touch communication channel where the touchscreen device receives and demodulates the pilot signal sent by the electronic card without error.

16. The electronic card of claim 14, wherein one or more photodetectors co-locate with one or more conductive touchpoints at the electronic card.

17. The electronic card of claim 15, wherein when the electronic card is placed in proximity to the touchscreen device, the position and orientation of the electronic card relative to the touchscreen device is determined by the one or more photodetector co-located with one or more conductive touchpoints.

18. The electronic card of claim 13, wherein the conductive touchpoints comprises anchor points and info points and the anchor points are reconfigured to info points after the position and orientation of the electronic card relative to the touchscreen device is determined.

19. The electronic device of claim 14 further comprising photodetectors that are capable of detecting visible light of different colors and decoding visible light signal having multi-logic level.

20. The electronic card of claim 14 wherein the visible light signals received by both preferred optical communication channels and non-preferred optical communication channels contains the same message, further comprising a module capable of combining and averaging the signals received by all the optical communication channels together.

* * * * *